(12) United States Patent
Kitagawa et al.

(10) Patent No.: US 8,675,083 B2
(45) Date of Patent: Mar. 18, 2014

(54) PROXIMITY WIRELESS COMMUNICATION APPARATUS INCLUDING FIXED HOUSING AND MOVABLE HOUSING ROTATED ENDLESSLY

(75) Inventors: Daisaku Kitagawa, Osaka (JP); Takeshi Nakayama, Hyogo (JP); Masahiro Ishii, Hyogo (JP)

(73) Assignee: Panasonic Corporation, Osaka (JP)

( * ) Notice: Subject to any disclaimer, the term of this patent is extended or adjusted under 35 U.S.C. 154(b) by 171 days.

(21) Appl. No.: 13/387,178

(22) PCT Filed: May 11, 2011

(86) PCT No.: PCT/JP2011/002626
§ 371 (c)(1),
(2), (4) Date: Jan. 26, 2012

(87) PCT Pub. No.: WO2011/151975
PCT Pub. Date: Dec. 8, 2011

(65) Prior Publication Data
US 2012/0122400 A1    May 17, 2012

(30) Foreign Application Priority Data
May 31, 2010    (JP) ................................. 2010-124126

(51) Int. Cl.
*H04N 5/232*    (2006.01)
(52) U.S. Cl.
USPC ..................... 348/211.2; 348/211.4; 455/41.2
(58) Field of Classification Search
USPC ............................ 348/211.2, 211.4; 455/41.2
See application file for complete search history.

(56) References Cited

U.S. PATENT DOCUMENTS

| | | | |
|---|---|---|---|
| 4,939,400 | A | 7/1990 | Matsushita et al. |
| 6,384,587 | B2 | 5/2002 | Aizawa et al. |
| 6,510,125 | B1 | 1/2003 | Shigetomi et al. |

(Continued)

FOREIGN PATENT DOCUMENTS

| | | |
|---|---|---|
| CN | 1162984 C | 8/2004 |
| JP | 61-79514 | 5/1986 |

(Continued)

OTHER PUBLICATIONS

International Preliminary Report on Patentability and Written Opinion issued Jan. 17, 2013 in corresponding International (PCT) Application No. PCT/JP2011/002626.

(Continued)

*Primary Examiner* — Creighton Smith
(74) *Attorney, Agent, or Firm* — Wenderoth, Lind & Ponack, L.L.P.

(57) ABSTRACT

One array antenna including three induction coils is formed on an application integrated circuit of a fixed housing. Eight array antennas, each of which is arranged in a manner similar to that of the array antennas of the application integrated circuit, are formed at intervals of 45 degrees around a rotation axis on an imaging process integrated circuit of a movable housing. A controller selects one of the eight array antennas of the imaging process integrated circuit so that a magnitude of a difference between a rotation angle of a movable housing and a rotation angle of the movable housing becomes equal to or smaller than 22.5 degrees based on the rotation angle of the movable housing, and controls a stepping motor so that a selected array antenna opposes to the array antenna on the application integrated circuit.

17 Claims, 20 Drawing Sheets

(56) References Cited

U.S. PATENT DOCUMENTS

| | | | | |
|---|---|---|---|---|
| 7,573,502 | B2* | 8/2009 | Sassa | 348/211.2 |
| 8,319,693 | B2* | 11/2012 | Chakam et al. | 343/713 |
| 2001/0038280 | A1 | 11/2001 | Aizawa et al. | |
| 2007/0257849 | A1* | 11/2007 | Kawasaki et al. | 343/702 |
| 2009/0268835 | A1* | 10/2009 | Imai et al. | 375/267 |
| 2010/0027522 | A1* | 2/2010 | Mukai et al. | 370/338 |
| 2010/0182212 | A1* | 7/2010 | Lin | 343/792.5 |

FOREIGN PATENT DOCUMENTS

| | | |
|---|---|---|
| JP | 1-212131 | 8/1989 |
| JP | 6-260975 | 9/1994 |
| JP | 8-149054 | 6/1996 |
| JP | 11-298210 | 10/1999 |
| JP | 2001-309013 | 11/2001 |
| JP | 2007-201576 | 8/2007 |

OTHER PUBLICATIONS

International Search Report issued Jun. 14, 2011 in International (PCT) Application No. PCT/JP2011/002626.
Chinese Office Action (OA) issued Jan. 2, 2014 in corresponding Chinese Patent Application No. 201180002963.X, together with English translation thereof.
Chinese Search Report (SR) issued Jan. 2, 2014 in corresponding Chinese Patent Application No. 201180002963.X, together with English translation thereof.

* cited by examiner

Fig.6

| ROTATIONAL ANGLE θ3 (DEGREES) OF CAMERA PART 31 | ROTATIONAL ANGLE θ4 (DEGREES) OF IMAGING PROCESS INTEGRATED CIRCUIT 46 | SELECTED INDUCTION COILS |
|---|---|---|
| 0 ≦ θ3 < 22.5 | 0 | A1, A2, A3 |
| 22.5 ≦ θ3 < 67.5 | 45 | H1, H2, H3 |
| 67.5 ≦ θ3 < 112.5 | 90 | G1, G2, G3 |
| 112.5 ≦ θ3 < 157.5 | 135 | F1, F2, F3 |
| 157.5 ≦ θ3 < 202.5 | 180 | E1, E2, E3 |
| 202.5 ≦ θ3 < 247.5 | 225 | D1, D2, D3 |
| 247.5 ≦ θ3 < 292.5 | 270 | C1, C2, C3 |
| 292.5 ≦ θ3 < 337.5 | 315 | B1, B2, B3 |
| 337.5 ≦ θ3 < 360 | 0 | A1, A2, A3 |

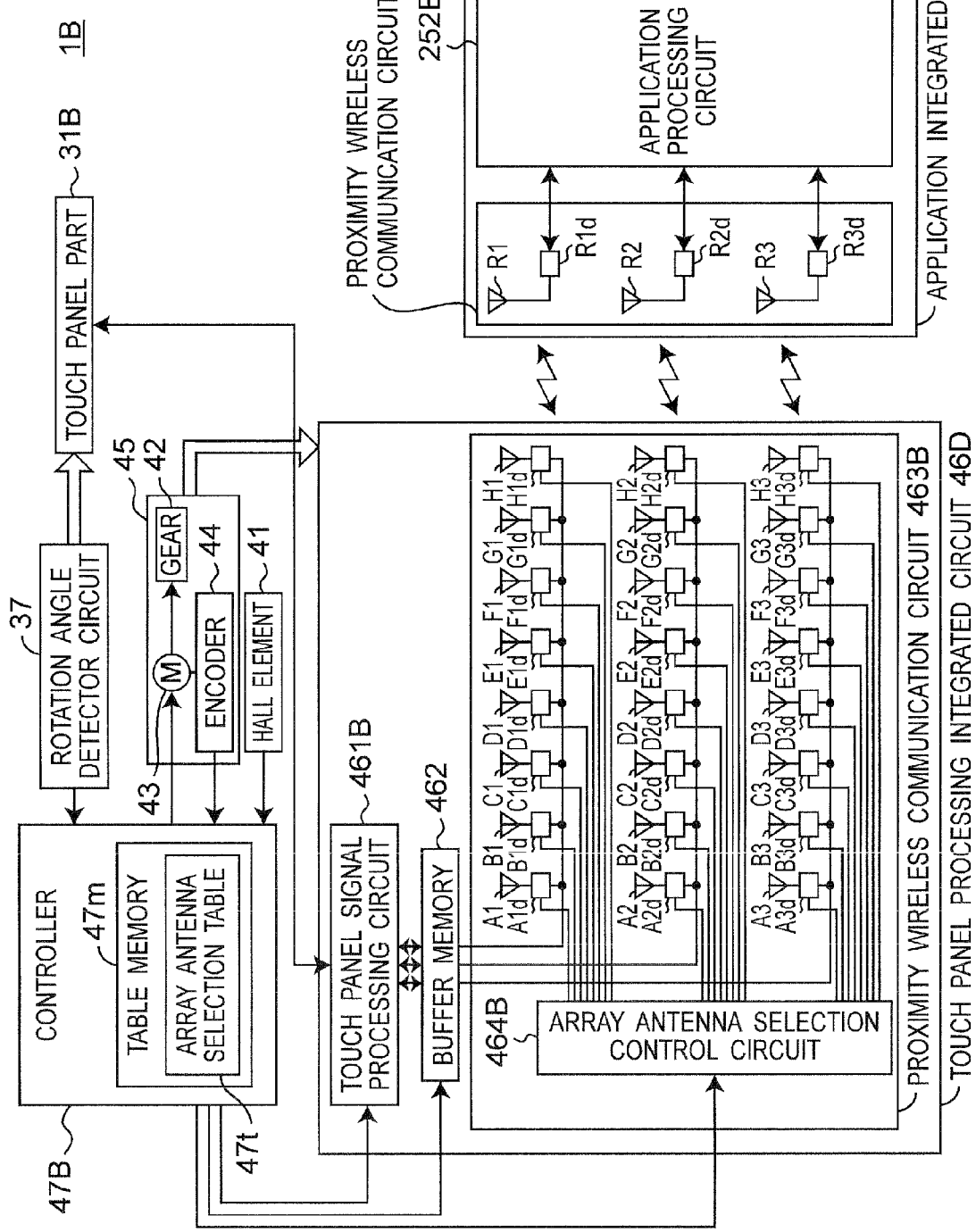

PROXIMITY WIRELESS COMMUNICATION APPARATUS INCLUDING FIXED HOUSING AND MOVABLE HOUSING ROTATED ENDLESSLY

TECHNICAL FIELD

The present invention relates to a proximity wireless communication apparatus. In particular, the present invention relates to a proximity wireless communication apparatus having a fixed housing and a movable housing rotating in an endless track (also referred to as rotating endlessly hereinafter) on the fixed housing.

BACKGROUND ART

In a variety of fields, products with a movable housing that performs rotating operation are used. A portable telephone apparatus including a rotary display, a rotary radar, and a tracking camera are examples of such products. Generally speaking, there is a limitation in a rotational range of the movable housing that performs rotating operation, however, some products are required to be rotatable in an endless track (to be able to rotate unlimited times) without limitations in the rotational range. As a typical example of the products required to be rotatable in an endless track, there is a surveillance camera apparatus. Numbers of surveillance camera apparatuses are used for the purpose of surveiling intruders in areas where an unspecified number of people enter and exit, off-limit districts and so on. The surveillance camera apparatuses need to have wide surveillance ranges in some areas because of its function of surveillance. Therefore, in order to tail intruders by changing the field of view of the surveillance camera apparatus in a wide range, the surveillance camera apparatus are provided with driving apparatuses for driving its camera in a pan direction (in a horizontal direction) and in a tilt direction (in an elevation direction).

When the fixed housing of the surveillance camera apparatus is wirely connected to the movable housing, to which the camera is attached, by means of a wiring cable, the wiring cable is twisted, and the movable housing cannot be endlessly rotated. Therefore, previously, the fixed housing and the movable housing have been electrically connected together by using a slip ring. However, when the slip ring is used, there has been such a problem that only low-resolution analog video data and control data of a relatively smaller amount of information are allowed to be transmitted from the camera to an image processing circuit provided in the fixed housing.

In order to solve this problem, the Patent Document 1 discloses a camera apparatus configured to include a fixed part and a movable part that pivots about a rotation axis. The fixed parts includes at least a first wireless part, a first signal processing part and a power supply part, and the movable part includes at least a camera part, a second signal processing part, a second wireless part and a drive part to drive the camera part. The first wireless part is coupled to the second wireless part by a waveguide through which radio waves propagate, and the waveguide path of the waveguide coincides with a center of the rotation axis of the movable part. According to the camera apparatus of the Patent Document 1, the fixed part and the movable part are wirelessly connected to each other, and therefore, the movable part can endlessly rotate, and it is possible to transmit video data having a resolution higher than when the slip ring is used.

CITATION LIST

Patent Document

Patent Document 1: Japanese Patent Laid-open Publication No. 2007-201576 A.

SUMMARY OF INVENTION

Technical Problem

The camera apparatus of the Patent Document 1 is endlessly rotatable, however, it has had a problem that it is required to provide the movable part and the fixed part with the first and second wireless parts for transmitting and receiving high-frequency signals in a millimeter waveband, respectively, and this leads to an increased cost larger than a cost when the slip ring is used. In addition, when compared with the case where the movable part and the fixed part are wirely connected together, there has been such a problem that a data transfer speed is smaller, and only low-resolution video data is allowed to be transmitted. In order to avoid the increased cost and to increase the data transfer speed, it can be considered to implement the first signal processing part provided for the fixed part and the second signal processing part provided for the movable part respectively by large scale integrated circuits (Large-Scale Integrations; referred to as LSIs hereinafter), respectively, and to implement wireless communications between the LSIs by proximity wireless communication such as wireless TSV (Through Silicon Via). However, the camera apparatus described in the Patent Document 1 has the configuration in which the first wireless part is coupled to the second wireless part by the waveguide through which the radio waves propagate, and the waveguide path of the waveguide coincide with the center of the rotation axis of the movable part. Therefore, it has been unable to utilize the proximity wireless communication that forms and uses a plurality of warless communication paths by opposing a plurality of transmitting antennas to a plurality of receiving antennas, respectively, so as to raise the data transfer speed.

It is an object of the present invention to provide a proximity wireless communication apparatus for a surveillance camera apparatus or the like capable of solving the above-described problems, being rotated endlessly, raising the data transfer speed in comparison with the prior art, and being realized at low cost.

Solution to Problem

A proximity wireless communication apparatus according to the present invention includes a fixed housing and a first movable housing provided so as to rotate about a predetermined rotation axis on the fixed housing. The fixed housing includes a first proximity wireless communication circuit including a first array antenna including a plurality of antenna elements each fixed in the fixed housing. The first movable housing includes first driving means that rotates the first movable housing, a second proximity wireless communication circuit, and control means. A second proximity wireless communication circuit includes a plurality of second array antennas, each of the plurality of second array antennas including a plurality of antenna elements fixed in the first movable housing and being arranged to oppose to the first array antenna when the first movable housing is rotated by a predetermined rotation angle. The control means selects one of the plurality of second array antennas, controls the first driving means so that a selected second array antenna opposes to the first array antenna, and controls the first and second proximity wireless communication circuits to perform a proximity wireless communication between the first and second proximity wireless communication circuits via the first array antenna and the selected second array antenna.

In the above-described proximity wireless communication apparatus, the proximity wireless communication is one of a wireless communication from the first proximity wireless communication circuit to the second proximity wireless communication circuit, a wireless communication from the second proximity wireless communication circuit to the first proximity wireless communication circuit, and a bidirectional wireless communication between the first proximity wireless communication circuit and the second proximity wireless communication circuit.

In addition, in the above-described proximity wireless communication apparatus, the plurality of second array antennas are arranged at predetermined angular intervals around the rotation axis.

Further, in the above-described proximity wireless communication apparatus, the plurality of antenna elements of the first array antenna are arranged on a straight line perpendicular to the rotation axis.

Still further, in the above-described proximity wireless communication apparatus, the plurality of antenna elements of the first array antenna are arranged on a plane perpendicular to the rotation axis, part of the plurality of antenna elements of the first array antenna are arranged on a first straight line perpendicular to the rotation axis, and other antenna elements of the plurality of antenna elements of the first array antenna are arranged on a second straight line perpendicular to the rotation axis.

In addition, in the above-described proximity wireless communication apparatus, the plurality of antenna elements of the first array antenna are arranged on a plane perpendicular to the rotation axis, and the plurality of antenna elements of the first array antenna are arranged on a plurality of straight lines perpendicular to the rotation axis, respectively.

Further, in the above-described proximity wireless communication apparatus, one antenna element of the plurality of antenna elements of the first array antenna is arranged on the rotation axis.

In addition, the above-described proximity wireless communication apparatus, further includes a second movable housing provided to rotate about the rotation axis on the fixed housing. The second movable housing includes an electronic equipment that is fixed to the second movable housing and performs wired communication with the second proximity wireless communication circuit. The control means selects one of the plurality of second array antennas so that a magnitude of a difference between a rotation angle of the first movable housing and a rotation angle of the second movable housing becomes a minimum based on the rotation angle of the second movable housing, controls the first driving means so that a selected second array antenna opposes to the first array antenna, and controls the first and second proximity wireless communication circuits to perform a proximity wireless communication between the electronic equipment and the first proximity wireless communication circuit via the second proximity wireless communication circuit.

Further, the above-described proximity wireless communication apparatus further includes a second movable housing provided to rotate about the rotation axis on the fixed housing. The second movable housing includes electronic equipment that is fixed to the second movable housing and performs wired communication between the equipment and the second proximity wireless communication circuit. The control means selects one of the plurality of second array antennas so that a magnitude of a difference between the rotation angle of the first movable housing and the rotation angle of the second movable housing becomes equal to or smaller than a half angle of the angular interval based on the rotation angle of the second movable housing, and controls the first and second proximity wireless communication circuits to perform a proximity wireless communication between the first and second proximity wireless communication circuits via the first array antenna and the selected second array antenna.

Still further, in the above-described proximity wireless communication apparatus, the electronic equipment is wirely connected to the second proximity wireless communication circuit by means of a cable having a length required to rotate the first movable housing and the second movable housing mutually independently.

In addition, in the above-described proximity wireless communication apparatus, the first movable housing further includes a buffer memory that stores predetermined signal data. The control means controls the first driving means so that the selected second array antenna opposes to the first array antenna, and thereafter, controls the buffer memory to output signal data outputted to the buffer memory to the first proximity wireless communication circuit.

Further, in the above-described proximity wireless communication apparatus, the electronic equipment is an imaging apparatus that generates video data and outputs the video data to the buffer memory as the signal data.

Still further, in the above-described proximity wireless communication apparatus, the second movable housing includes second driving means that rotates the second movable housing, and the control means controls the second driving means to direct the electronic equipment toward a predetermined direction.

In addition, in the above-described proximity wireless communication apparatus, the control means controls the second driving means to continuously rotate the electronic equipment.

Further, in the above-described proximity wireless communication apparatus, the control means controls the second driving means to rotate the electronic equipment in steps.

Still further, in the above-described proximity wireless communication apparatus, each of the plurality of antenna elements of the first array antenna is an induction coil, and each of the plurality of antenna elements of the second array antenna is an induction coil. When the first array antenna and the selected second array antenna oppose to each other, the induction coils of the first array antenna and the induction coils of the selected second array antenna are inductively coupled with each other, respectively.

In addition, in the above-described proximity wireless communication apparatus, each of the plurality of antenna elements of the first array antenna has a predetermined resonance frequency, and each of the plurality of antenna elements of the second array antenna has the resonance frequency. When the first array antenna and the selected second array antenna oppose to each other, the antenna elements of the first array antenna and the antenna elements of the selected second array antenna are electromagnetically coupled with each other.

Advantageous Effects of Invention

The proximity wireless communication apparatus of the present invention selects one of the plurality of second array antennas provided for the first movable housing, controls the first driving means so that a selected second array antenna opposes to the first array antenna, and controls the first and second proximity wireless communication circuits to perform a proximity wireless communication between the first and second proximity wireless communication circuits via the first array antenna and the selected second array antenna. Therefore, according to the proximity wireless communication apparatus of the present invention can be rotated endlessly on the fixed housing. In addition, since the proximity wireless communication is performed, it is possible to increase the data transfer speed to be larger than that of the prior art, and the proximity wireless communication apparatus of the present invention can be realized at a cost lower than that of the prior art.

Further, the proximity wireless communication apparatus of the present invention selects one of the plurality of second array antennas so that a magnitude of a difference between a rotation angle of the first movable housing and a rotation angle of the second movable housing becomes a minimum based on the rotation angle of the second movable housing, controls the first driving means so that a selected second array antenna opposes to the first array antenna, and controls the first and second proximity wireless communication circuits to perform a proximity wireless communication between the electronic equipment and the first proximity wireless communication circuit via the second proximity wireless communication circuit Therefore, the second movable can be rotated endlessly on the fixed housing.

BRIEF DESCRIPTION OF DRAWINGS

FIG. 6 is a table showing an array antenna selection table 47t of FIG. 2;

FIG. 22 is a block diagram showing a configuration of a portable telephone apparatus 1B according to a third preferred embodiment of the present invention.

DESCRIPTION OF EMBODIMENTS

Figure 1:
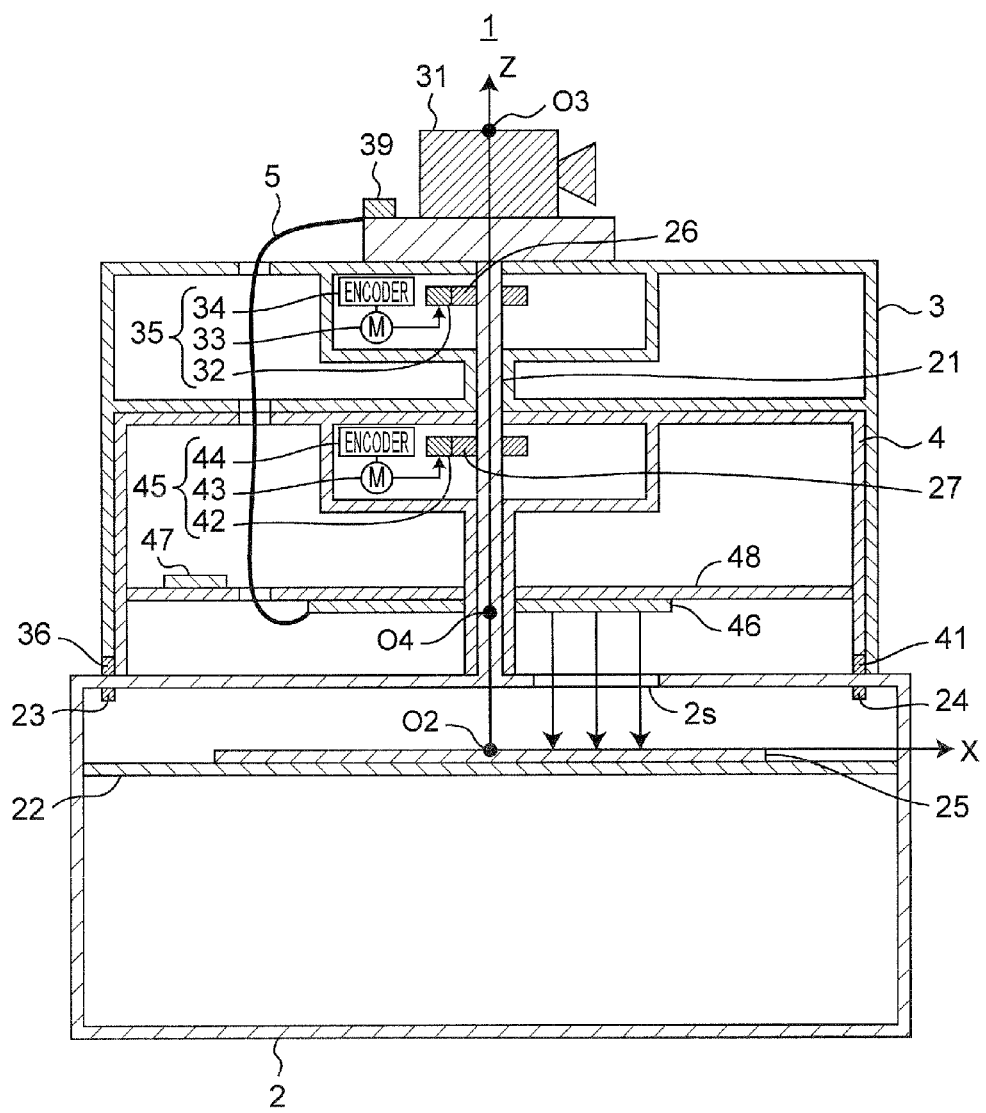
FIG. 1 is a sectional view showing a configuration of a camera apparatus 1 according to a first preferred embodiment of the present invention.

Preferred embodiments according to the present invention will be described below with reference to the attached drawings. In the following preferred embodiments, components similar to each other are denoted by the same reference numerals.

First Preferred Embodiment

Figure 2:
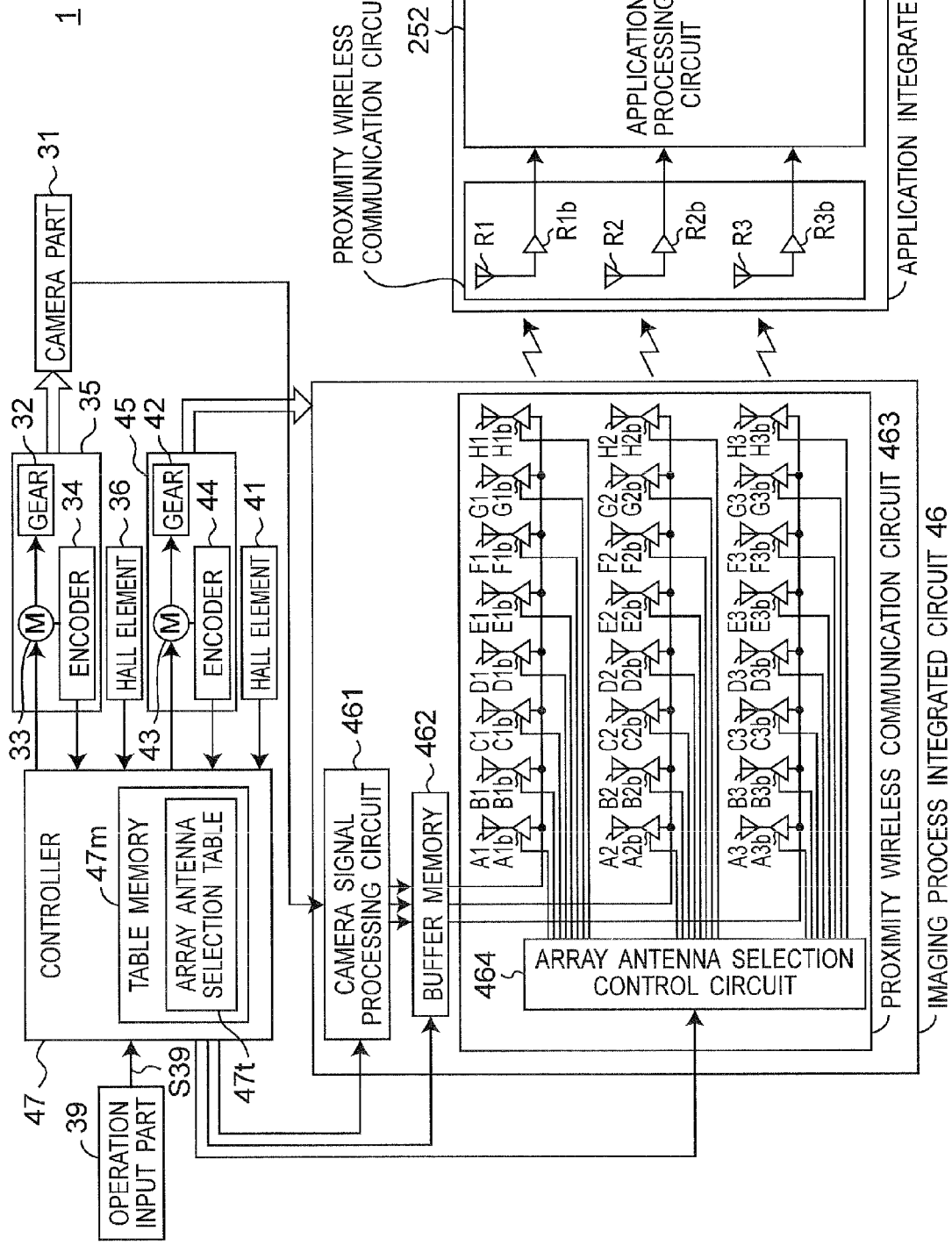
FIG. 2 is a block diagram showing the configuration of the camera apparatus 1 of FIG. 1.
Figure 3:
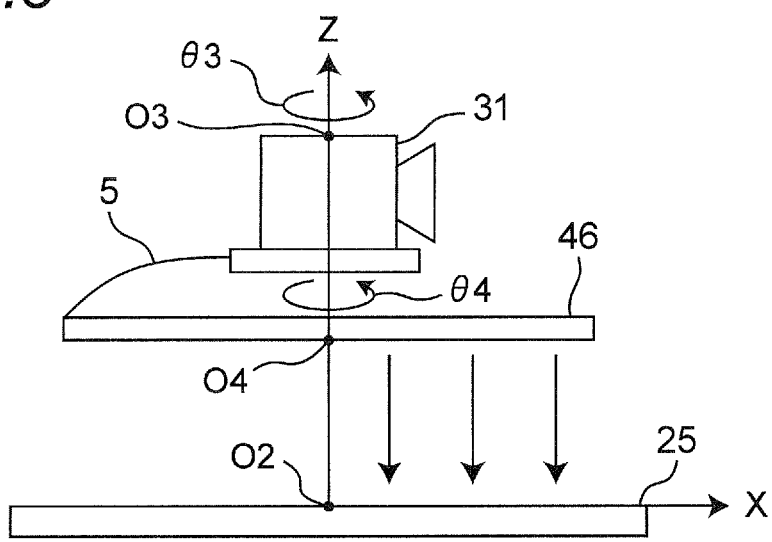
FIG. 3 is a side view showing an application integrated circuit 25, an imaging process integrated circuit 46, a camera part 31, and a flexible cable 5 of FIG. 1.
Figure 4:
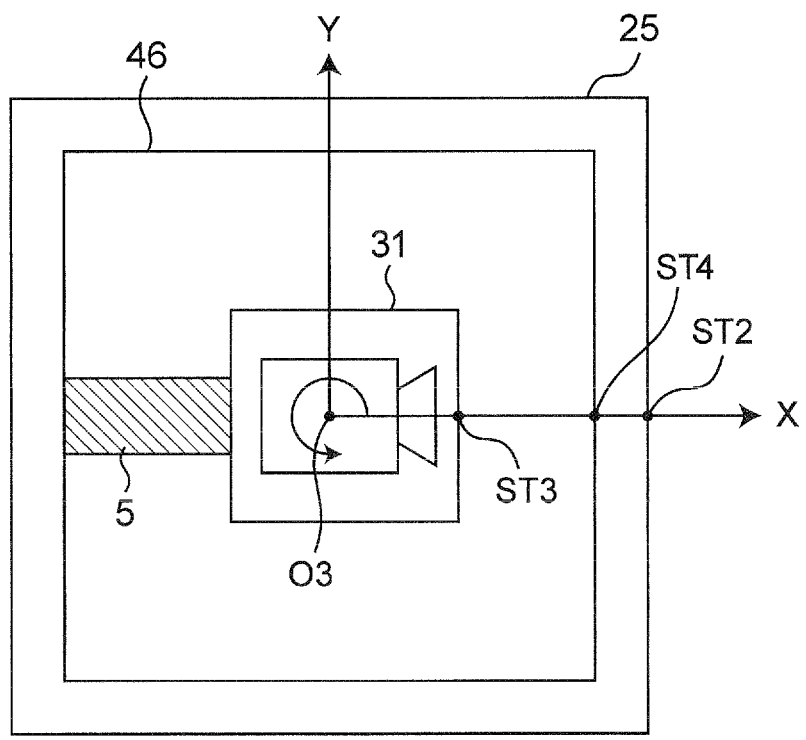
FIG. 4 is a plan view showing the application integrated circuit 25, the imaging process integrated circuit 46, the camera part 31, and the flexible cable 5 of FIG. 1.
Figure 5:
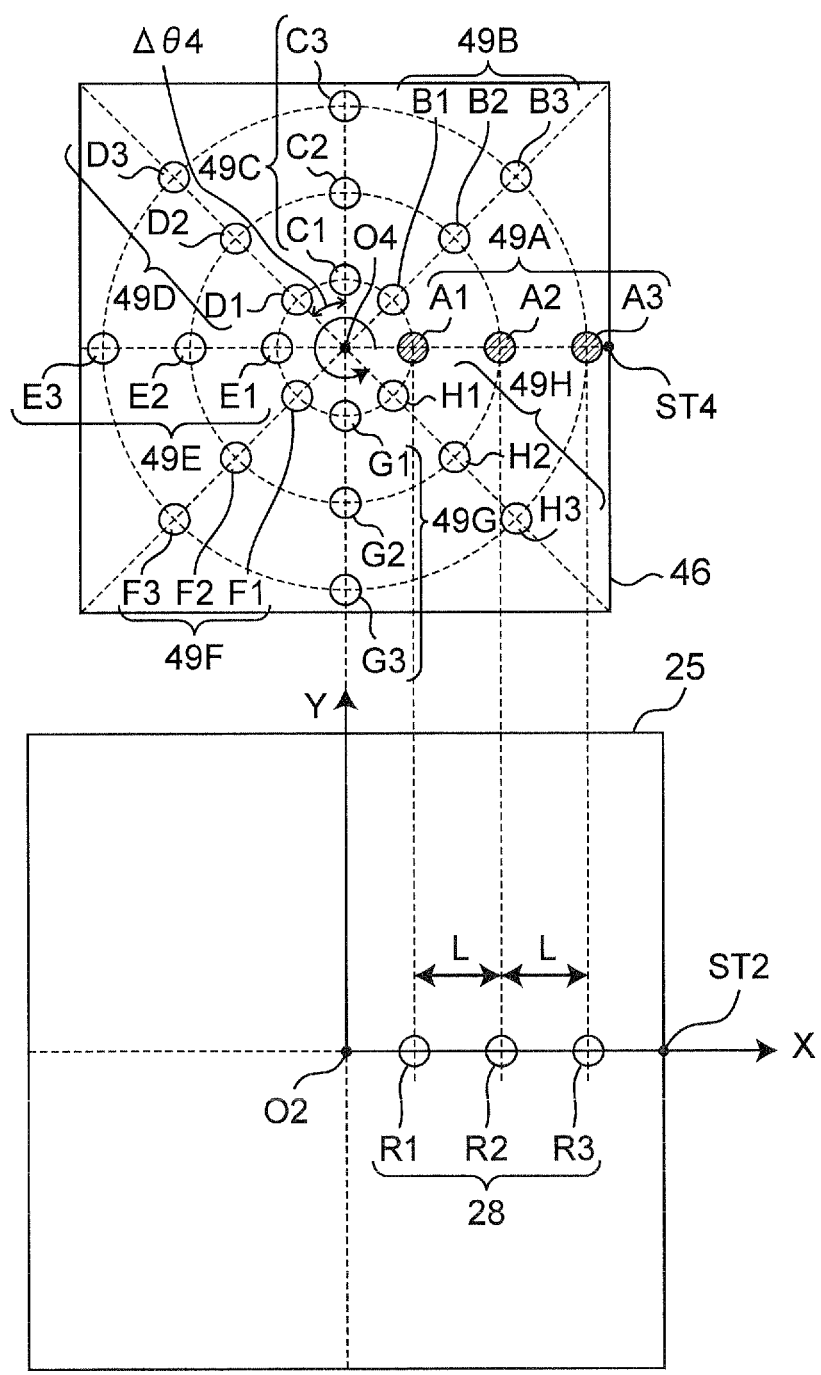
FIG. 5 is a plan view showing array antennas 49A to 49H formed on the imaging process integrated circuit 46 of FIG. 1, and an array antenna 28 formed on the application integrated circuit 25.
Figure 7:
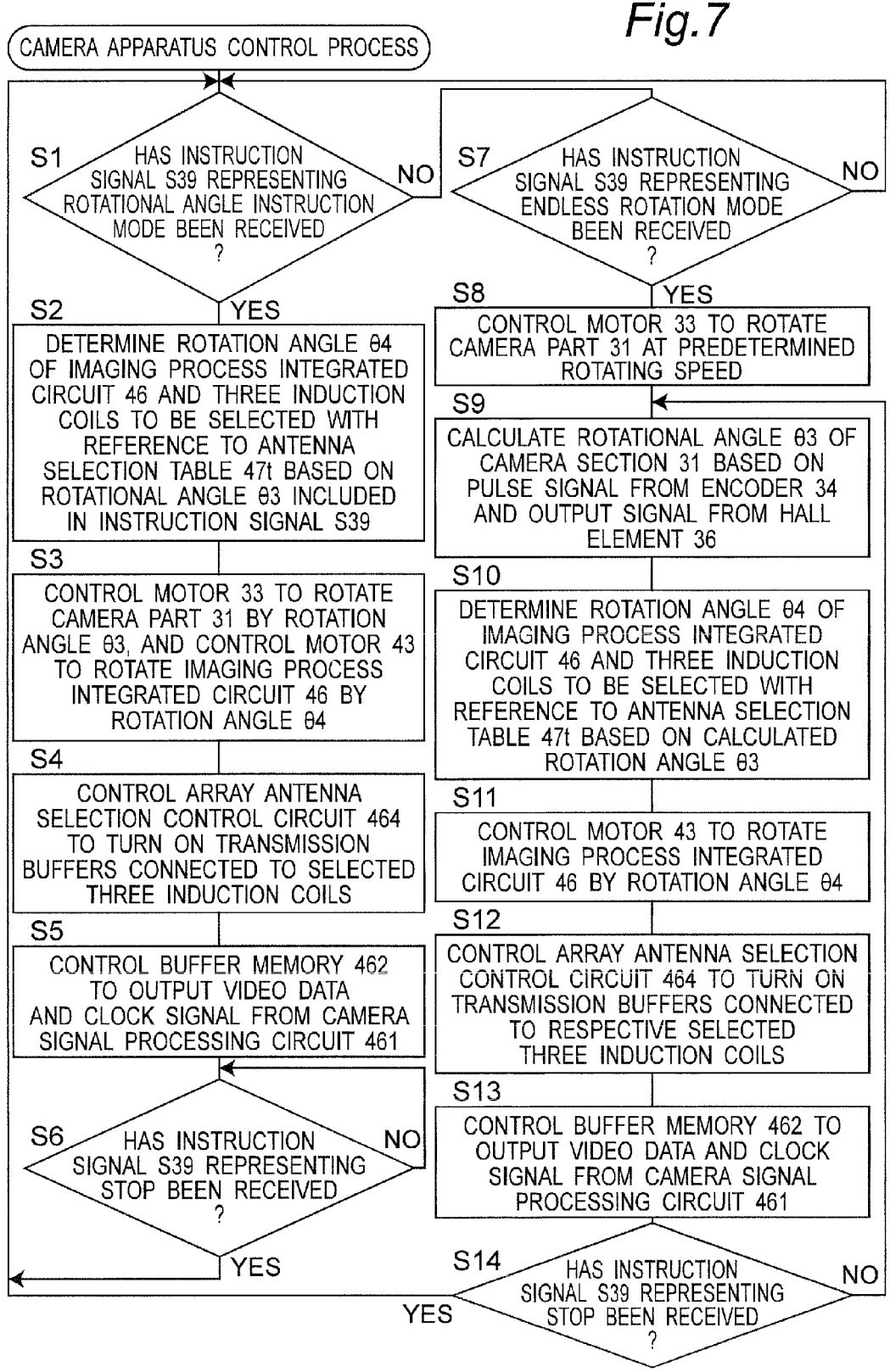
FIG. 7 is a flow chart showing a camera apparatus control process executed by a controller 47 of FIG. 2.

FIG. 1 is a sectional view showing a configuration of a camera apparatus 1 according to the first preferred embodiment of the present invention, and FIG. 2 is a block diagram showing the configuration of the camera apparatus 1 of FIG. 1. FIG. 3 is a side view showing an application integrated circuit 25, an imaging process integrated circuit 46, a camera part 31, and a flexible cable 5 of FIG. 1, and FIG. 4 is a plan view showing the application integrated circuit 25, the imaging process integrated circuit 46, the camera part 31, and the flexible cable 5 of FIG. 1. FIG. 5 is a plan view showing an array antennas 49A to 49H formed on the imaging process integrated circuit 46 of FIG. 1, and an array antenna 28 formed on the application integrated circuit 25. Further, FIG. 6 is a table showing an array antenna selection table 47t of FIG. 2, and FIG. 7 is a flow chart showing a camera apparatus control process executed by a controller 47 of FIG. 2.

As described later in detail, the camera apparatus 1 of the present preferred embodiment is configured to include a fixed housing 2, and movable housings 3 and 4 that are provided to rotate about a rotation axis 21 on the fixed housing 2. In this case, the fixed housing 2 includes a proximity wireless communication circuit 251 including the array antenna 28 that includes a plurality of induction coils R1, R2 and R3 fixed in the fixed housing 2. In addition, the movable housing 4 includes a driving apparatus 45 for rotating the movable housing 4, a proximity wireless communication circuit 463, and the controller 47. The proximity wireless communication circuit 463 includes eight array antennas 49A to 49H, each of which includes three induction coils fixed in the movable housing 4 and is arranged to oppose to the array antenna 28 when the movable housing 4 is rotated by a predetermined angle. In this case, the controller 47 is characterized to select one of the array antennas 49A to 49H so that a magnitude of a difference between a rotation angle θ3 of the movable housing 3 and a rotation angle θ4 of the movable housing 4 becomes the minimum based on the rotation angle of the movable housing 3, control the driving apparatus 45 so that a selected array antenna opposes to the array antenna 28, and controls the proximity wireless communication circuit 251 and the second proximity wireless communication circuit 463 to perform a proximity wireless communication between the proximity wireless communication circuit 251 and the second proximity wireless communication circuit 463 via the array antenna 28 and the array antenna selected from among the array antennas 49A to 49H.

Referring to FIG. 1, the camera apparatus 1 is configured to include the fixed housing 2 having a rotation axis 21, the movable housing 3 that is slidably and rotatably supported to the rotation axis 21, and the movable housing 4 that is slidably and rotatably supported to the rotation axis 21. In this case, gears 26 and 27 are fixed to the rotation axis 21. In addition, a dielectric substrate 22 is fixed inside the fixed housing 2 at an angle perpendicular to the rotation axis 21, and an application integrated circuit 25 that is an LSI formed of one silicon device is mounted on the upper surface of the dielectric substrate 22. Further, magnets 23 and 24 are provided inside the fixed housing 2.

In addition, referring to FIG. 1, a driving apparatus 35 for endlessly rotating the movable housing 3 in a direction counterclockwise about the rotation axis 21 is provided inside the movable housing 3. In this case, the driving apparatus 35 is configured to include a stepping motor 33, a gear 32 that is fixed to a shaft of the stepping motor 33 and is engaged with the gear 26, and an encoder 34 that detects a rotating speed of the stepping motor 33 and generates a pulse signal representing the rotating speed. In addition, a Hall element 36 is provided for the movable housing 3 so that the Hall element 36 opposes to the magnet 23 when the movable housing 3 (i.e., the camera part 31) is located in a predetermined reference position described later in detail. The encoder 34 and the Hall element 36 constitute a rotation angle detection means for detecting the rotation angle θ3 (See FIG. 3) of the movable housing 3. Further, the camera part 31, which is an imaging apparatus to generate digital video data (signal data), and an operation input part 39 of a switch or a numeric keypad are fixed on an upper portion of the movable housing 3. The camera apparatus 1 has two operation modes of an endless rotation mode in which the camera part 31 is continuously and endlessly rotated about the rotation axis 21, and a rotation angle instruction mode in which the rotation angle θ3 (See FIG. 3) of the camera part 31 is specified. The user of the camera apparatus 1 is able to give an instruction of operation in the endless rotation mode or to give an instruction of operation in the rotation angle instruction mode, and an input of the rotation angle θ3 of the camera part 31 to the operation input part 39. The operation input part 39 generates an instruction signal S39 including information of the instruction from the user, and outputs the same signal to the controller 47 provided for the movable housing 4.

Further, referring to FIG. 1, a dielectric substrate 48 is fixed inside the movable housing 4 at an angle perpendicular to the rotation axis 21, the controller 47 is mounted on a upper surface of the dielectric substrate 48, and the imaging process integrated circuit 46 that is an LSI formed of one silicon device is mounted on a lower surface of the dielectric substrate 48. Further, a driving apparatus 45 for endlessly rotating the movable housing 4 in a direction counterclockwise to the rotation axis 21 is provided inside the movable housing 4. In this case, the driving apparatus 45 is configured to include a stepping motor 43, a gear 42 that is fixed to a shaft of the stepping motor 43 and engaged with the gear 27, and an encoder 44 that detects a rotating speed of the stepping motor 43 and generates a pulse signal representing the rotating speed. In addition, a Hall element 41, that opposes to the magnet 24 when the imaging process integrated circuit 46 is located in a predetermined reference position described later in detail, is provided for the movable housing 4. The encoder 44 and the Hall element 41 constitute a rotation angle detection means for detecting the rotation angle θ4 (See FIG. 3) of the movable housing 4.

Further, as shown in FIGS. 1 to 4, respective circuits including the camera part 31, the operation input part 39, the stepping motor 33, the encoder 34 and the Hall element 36, which are provided for the movable housing 3, are electrically connected to connecting conductors at an end portion of the imaging process integrated circuit 46 by using a flexible cable 5 (See FIGS. 3 and 4). Video data from the camera part 31 is outputted to the camera signal processing circuit 461 (See FIG. 2) of the imaging process integrated circuit 46 via the flexible cable 5. On the other hand, the instruction signal S39 (See FIG. 2) including the information of the instruction from the user inputted by using the operation input part 39 and respective output signals from the encoder 34 and the Hall element 36 are outputted to the controller 47 via the flexible cable 5 and connecting wiring conductors formed on the dielectric substrate 48. In addition, a control signal for the stepping motor 33 is outputted from the controller 47 to the stepping motor 33 via the connecting wiring conductors formed on the dielectric substrate 48 and the flexible cable 5, and the stepping motor 33 rotates the movable housing 3 in response to this. Further, the stepping motor 43, the encoder 44 and the Hall element 41 are each electrically connected to the controller 47 via connecting wiring conductors in the movable housing 4. The output signals from the encoder 44 and the Hall element 41 are outputted to the controller 47. In addition, a control signal for the stepping motor 43 is outputted from the controller 47 to the stepping motor 33, and the stepping motor 43 rotates the movable housing 4 in response to this.

Referring to FIG. 1, it is noted that the camera part 31 and the imaging process integrated circuit 46 rotate about the rotation axis 21 mutually independently as described later in detail. Therefore, the flexible cable 5 has a sufficient and shortest length so that neither disconnection nor twisting occurs even if the camera part 31 and the imaging process integrated circuit 46 rotate mutually independently and the positions of both ends of the flexible cable 5 consequently are located apart.

Further, referring to FIG. 1, electric powers are supplied directly from an external power supply to the respective circuits including the application integrated circuit 25 provided for the fixed housing 2. In addition, a slip ring (not shown) for supplying electric powers from the external power supply to the respective circuits provided for the movable housings 3 and 4 via the fixed housing 2 is provided between the fixed housing 2 and the movable housings 3 and 4.

As shown in FIGS. 1, 3, 4 and 5, a center of rotation of the camera part 31 is defined as O3, and a center of rotation of the imaging process integrated circuit 46 is defined as O4 in the present preferred embodiment. Further, a position of projection of the centers of rotation O3 and O4 on the application integrated circuit 25 is defined as an origin O2 of a cylindrical coordinate system, and the upward direction with respect to the origin O2 is defined as a positive direction of a Z axis. A direction directed rightward from the origin on FIGS. 1 and 4 is defined as a positive direction of an X axis. An intersecting point of the application integrated circuit 25 and the positive direction of the X axis is defined as a reference point ST2 of the application integrated circuit 25. In addition, a reference position of the camera part 31 is defined as shown in FIG. 4, an intersecting point of the camera part 31 and the positive direction of the X axis when the camera part 31 is located in the reference position is defined as a reference point ST3 of the camera part 31, and a rotation angle of the camera part 31 from the reference position is defined as θ3. Further, a reference position of the imaging process integrated circuit 46 is defined as shown in FIG. 4, an intersecting point of the imaging process integrated circuit 46 and the positive direction of the X axis when the imaging process integrated circuit 46 is located in the reference position is defined as a reference point ST4 of the imaging process integrated circuit 46, and a rotation angle of the imaging process integrated circuit 46 from the reference position is defined as θ4.

Referring to FIG. 1, the controller 47 detects whether or not the movable housing 3 is located in the reference position thereof based on the output signal from the Hall element 36, counts the number of pulses of the pulse signal from the encoder 34 from the timing when the movable housing 3 is located in the reference position thereof, and calculates the rotation angle θ3 based on a counted number of pulses and a known number of pulses when the movable housing 3 makes a turn. The controller 47 rotates the movable housing 3 (i.e., the camera part 31) by a desired angle by driving the stepping motor 33 based on the calculated rotation angle θ3. In a manner similar to above, the controller 47 detects whether or not the movable housing 4 is located in the reference position thereof based on the output signal from the Hall element 41, counts the number of pulses of the pulse signal from the encoder 44 from the timing when the movable housing 4 is located in the reference position thereof, and calculates the rotation angle θ4 based on a counted number of pulses and the known number of pulses when the movable housing 4 makes a turn. The controller 47 rotates the movable housing 4 (i.e., the imaging process integrated circuit 46) by a desired angle by driving the stepping motor 43 based on the calculated rotation angle θ4.

Referring to FIG. 5, an array antenna 28 is formed on the upper surface of the application integrated circuit 25. The array antenna 28 is configured to include three induction coils R1, R2 and R3 formed at intervals of L in a positive portion of the X axis. In addition, referring to FIG. 5, eight array antennas 49A to 49H are formed at 45-degree angular intervals of Δθ4 around the rotation axis 21 on the surface of the imaging process integrated circuit 46. Each of the array antennas 49A to 49H is arranged to oppose to the array antenna 28. It is noted that FIG. 5 shows a perspective view when the imaging process integrated circuit 46 is seen from the positive direction of the Z axis in perspective. Concretely speaking, induction coils A1, A2 and A3 of the array antenna 49A are formed on the lower surface of the imaging process integrated circuit 46 so that the coils A1, A2 and A3 oppose to the induction coils R1, R2 and R3, respectively, when the imaging process integrated circuit 46 is located in the reference position (when the rotation angle θ4 is zero degrees). In a manner similar to above, induction coils H1, H2 and H3 of the array antenna 49H are formed so that the coils H1, H2 and H3 oppose to the induction coils R1, R2 and R3, respectively, when the rotation angle θ4 is 45 degrees. Induction coils G1, G2 and G3 of the array antenna 49G are formed so that the coils G1, G2 and G3 oppose to the induction coils R1, R2 and R3, respectively, when the rotation angle θ4 is 90 degrees. Induction coils F1, F2 and F3 of the array antenna 49F are formed so that the coils F1, F2 and F3 oppose to the induction coils R1, R2 and R3, respectively, when the rotation angle θ4 is 135 degrees. In addition, induction coils E1, E2 and E3 of the array antenna 49E are formed so that the coils E1, E2 and E3 oppose to the induction coils R1, R2 and R3, respectively, when the rotation angle θ4 is 180 degrees. Induction coils D1, D2 and D3 of the array antenna 49D are formed so that the coils D1, D2 and D3 oppose to the induction coils R1, R2 and R3, respectively, when the rotation angle θ4 is 225 degrees. Further, induction coils C1, C2 and C3 of the array antenna 49C are formed so that the coils C1, C2 and C3 oppose to the induction coils R1, R2 and R3, respectively, when the rotation angle θ4 is 270 degrees. Induction coils B1, B2 and B3 of the array antenna 49B are formed so that the coils B1, B2 and B3 oppose to the induction coils R1, R2 and R3, respectively, when the rotation angle θ4 is 315 degrees. It is noted that a slit 2s is provided in a portion of the movable housing 2, where the porting opposing to the array antenna 28.

As described later in detail, the controller 47 makes one array antenna of the array antennas 49A to 49H oppose to the array antenna 28 by rotating the imaging process integrated circuit 46 by an angular interval Δθ4 of 45-degree. In this case, when, for example, the induction coils A1, A2 and A3 oppose to the induction coils R1, R2 and R3, respectively, each of the induction coil pair A1 and R1, the induction coil pair A2 and R2, and the induction coil pair A3 and R3 is inductively coupled together to form a wireless transmission path. Then, three formed wireless transmission paths are used for proximity wireless communication using wireless TSV. In this case, the wireless TSV is a wireless communication intended for a near field (field at a short distance or a very short distance being equal to or smaller than one-tenth of the wavelength of an electromagnetic wave). For example, when a 40-GHz electromagnetic wave propagates in silicon, 1 mm or less is the near field. In the present preferred embodiment, a distance between the pair of mutually opposing induction coils (a distance between the upper surface of the imaging process integrated circuit 46 and the lower surface of the application integrated circuit 25) is set to 1 mm or less. In addition, a diameter of each induction coil is set to a value smaller than the distance between the mutually opposing induction coils, and the distance L between the induction coils R1, R2 and R3 is set to a distance at which no interference occurs among the wireless transmission paths. It is noted that a data transfer speed achievable with one pair of induction coils is equal to or larger than 10 Gbps in the wireless TSV.

Referring to FIG. 2, the controller 47 is configured to include a table memory 47m that previously stores the array antenna selection table 47t. As shown in FIG. 6, the array antenna selection table 47t shows relations among the rotation angle θ3 of the camera part 31 (i.e., the movable housing 3), the rotation angle θ4 of the imaging process integrated circuit 46 (i.e., the movable housing 4) and the induction coils selected in the imaging process integrated circuit 46. Concretely speaking, the rotation angle θ4 of the imaging process integrated circuit 46 is set to one angle of zero degrees, 45 degrees, 90 degrees, 135 degrees, 180 degrees, 225 degrees, 270 degrees and 315 degrees so that the magnitude |θ3−θ4| of a difference between the rotation angle θ4 and the rotation angle θ3 becomes the minimum depending on the rotation angle θ3 of the camera part 31. According to the present preferred embodiment, the magnitude of the difference |θ3−θ4| between the rotation angle θ4 and the rotation angle θ3 is equal to or smaller than 22.5 degrees, which is one half of the angular interval Δθ4 (45 degrees) of the array antennas 49A to 49H.

In addition, referring to FIG. 2, the imaging process integrated circuit 46 is configured to include a camera signal processing circuit 461, a buffer memory 462, and a proximity wireless communication circuit 463. In this case, the proximity wireless communication circuit 463 is configured to the include induction coils A1, A2, A3, B1, B2, . . . , H1, H2 and H3, transmitting buffers A1b, A2b, A3b, B1b, B2b, . . . , H1b, H2b and H3b connected to the induction coils A1, A2, A3, B1, B2, . . . , H1, H2 and H3, respectively, and an array antenna selection control circuit 464 to execute turning-on and -off control of the transmitting buffers A1b, A2b, A3b, B1b, B2b, . . . , H1b, H2b and H3b. In this case, the camera signal processing circuit 461 executes predetermined signal processing on video data from the camera part 31 including a noise rejection process and a compression process, and thereafter, serial-to-parallel converts processed video data into two video data according to a predetermined clock signal, and outputs the clock signal and the two video data to the buffer memory 462. The buffer memory 462 outputs inputted clock signal and two video data to each of the transmitting buffers A1b, B1b, . . . , H1b, the transmitting buffers A2b, B2b, . . . , H2b, and the transmitting buffers A3b, B3b, . . . , H3b. In this case, as described later in detail, the array antenna selection control circuit 464 is controlled to transmit a control signal for turning on only three transmitting buffers connected to three induction coils included in the array antenna that opposes to the array antenna 28 among the induction coils A1, A2, A3, B1, B2, . . . , H1, H2, and H3, to the transmitting buffers A1b, A2b, A3b, B1b, B2b, . . . , H1b, H2b and H3b. By this operation, the clock signal and the two video data from the camera signal processing circuit 461 are wirelessly transmitted to the induction coils R1, R2 and R3 via the buffer memory 462, the transmitting buffers turned on by the array antenna selection control circuit 464, and the induction coils connected to the transmitting buffers turned on.

Further, referring to FIG. 2, the application integrated circuit 25 is configured to include a proximity wireless communication circuit 251 and an application processing circuit 252. In this case, the proximity wireless communication circuit 251 is configured to include the induction coils R1, R2 and R3, and receiving buffers R1b, R2b and R3b connected to the induction coils R1, R2, R3, respectively. The clock signal and the two video data received by the induction coils R1, R2 and R3 are outputted to the application processing circuit 252 via the receiving buffers R1b, R2b and R3b. The application processing circuit 252 parallel-to-serial converts inputted two video data into one video data according to an inputted clock signal, and executes predetermined application processing to a resultant video data including luminance adjustment processing, color difference adjustment processing and object recognition processing.

Next, the camera apparatus control process executed by the controller 47 of FIG. 2 is described with reference to FIG. 7. It is noted that the movable housings 3 and 4 are located in the respective reference positions thereof before the power of the camera apparatus 1 is turned on. First of all, when the power of the camera apparatus 1 is turned on, it is judged at step S1 whether or not the instruction signal S39 representing the rotation angle instruction mode has been received. If YES at step S1, then the control flow goes to step S2. On the other hand, if NO at step S1, then the control flow goes to step S7. In this case, the instruction signal S39 to designate the rotation angle instruction mode includes the rotation angle θ3 of the camera part 31. Then, at step S2, the controller 47 determines the rotation angle θ4 of the imaging process integrated circuit 46 and three induction coils to be selected with reference to the array antenna selection table 47t based on the rotation angle θ3 included in the instruction signal S39. Namely, at step S2, the controller 47 selects one array antenna from among the array antennas 49A to 49H. Further, at step S3, the controller 47 controls the stepping motor 33 to rotate the camera part 31 by the rotation angle θ3, and controls the stepping motor 43 to rotate the imaging process integrated circuit 46 by the rotation angle θ4, so as to oppose the three induction coils selected in the imaging process integrated circuit 46 to the induction coils R1, R2 and R3, respectively.

Then, at step S4, the controller 47 controls the array antenna selection control circuit 464 to turn on the transmitting buffers connected to the respective selected three induction coils. Subsequently, at step S5, the controller 47 controls the buffer memory 462 to output the video data and the clock signal from the camera signal processing circuit 461. By this operation, the video data and the clock signal from the camera signal processing circuit 461 are wirelessly transmitted to the application processing circuit 252 via the buffer memory 462, the transmitting buffers connected to the selected three induction coils, the selected three induction coils, the induction coils R1, R2 and R3, and the receiving buffers R1b, R2b, and R3b. Subsequently to step S5, it is judged at step S6 whether or not the instruction signal S39 representing stop of the camera apparatus 1 has been received. If YES at step S6, then the control flow returns to step S1. In this case, the controller 47 sets the movable housings 3 and 4 back to the respective reference positions thereof. In addition, if NO at step S6, then the processing of step S6 is repeated.

In addition, referring to FIG. 7, it is judged at step S7 whether or not the instruction signal S39 representing the endless rotation mode has been received. If YES at step S7, then the control flow goes to step S8. On the other hand, if NO at step S7, the control flow returns to step S1. At step S8, the controller 47 controls the stepping motor 33 to rotate the camera part 31 at a predetermined rotating speed. Next, at step S9, the controller 47 calculates the rotation angle θ3 of the camera part 31 based on the pulse signal from the encoder 34 and the output signal from the Hall element 36. Then, subsequently to step S9, the controller 47 determined the rotation angle θ4 of the imaging process integrated circuit 46 and the three induction coils to be selected at step S10 with reference to the array antenna selection table 47t based on the calculated rotation angle θ3. Namely, at step S10, the controller 47 selects one array antenna from among the array antennas 49A to 49H. Next, subsequently to step S10, the controller 47 controls the stepping motor 43 to rotate the imaging process integrated circuit 46 by the rotation angle θ4 at step S11, so as to oppose the three induction coils selected in the control stepping motor 43 to the induction coils R1, R2 and R3, respectively. Subsequently, at step S12, the controller 47 controls the array antenna selection control circuit 464 to turn on the transmitting buffers connected to the respective selected three induction coils. Next, the controller 47 controls the buffer memory 462 to output the video data from the camera signal processing circuit 461 at step S15, and the control flow goes to step S14. It is judged at step S14 whether or not the instruction signal S39 representing stop of the camera apparatus 1 has been received. If YES at step S14, then the control flow returns to step S1. In this case, the controller 47 sets the movable housings 3 and 4 back to the respective reference positions thereof. If NO at step S14, the control flow returns to step S9.

According to the camera apparatus control process of FIG. 7, the video data from the camera part 31 is continuously outputted to the camera signal processing circuit 461, and the video data and the clock signal from the camera signal processing circuit 461 are also continuously outputted to the buffer memory 462. On the other hand, the video data and the clock signal in the buffer memory 462 are outputted to the transmitting buffers connected to the selected array antenna only when the selected array antenna among the array antennas 49A to 49H of the imaging process integrated circuit 46 opposes to the array antenna 28, and wirelessly transmitted from the selected array antenna toward the array antenna 28. Therefore, the video data can be wirelessly transmitted with certainty higher than certainty when the buffer memory 462 is not used.

Figure 8A:
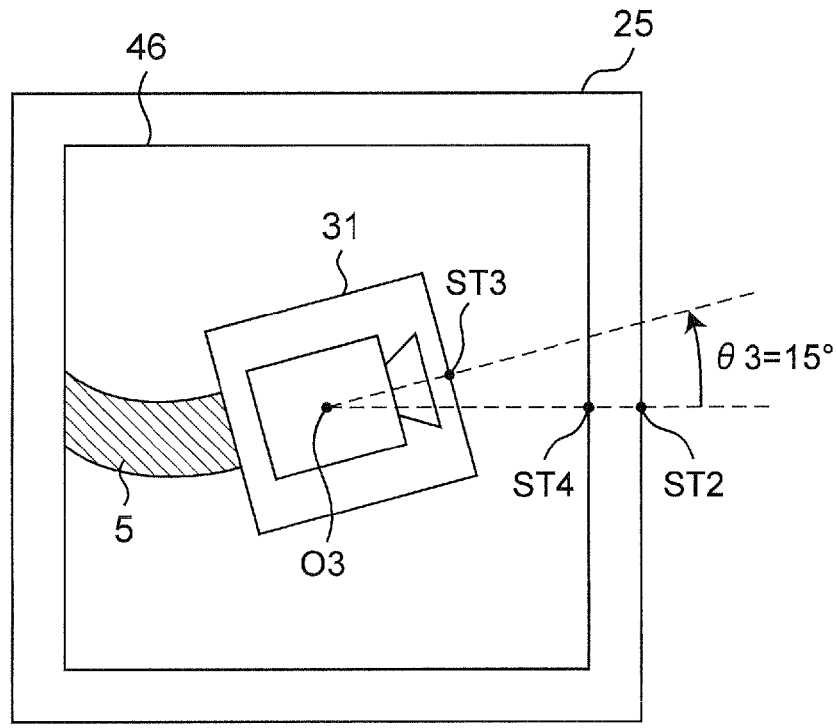
FIG. 8A is a plan view showing the application integrated circuit 25, the imaging process integrated circuit 46, the camera part 31, and the flexible cable 5 when a rotation angle θ3 of the camera part 31 of FIG. 1 is 15 degrees, and a rotation angle θ4 of the imaging process integrated circuit 46 is zero degrees.
Figure 8B:
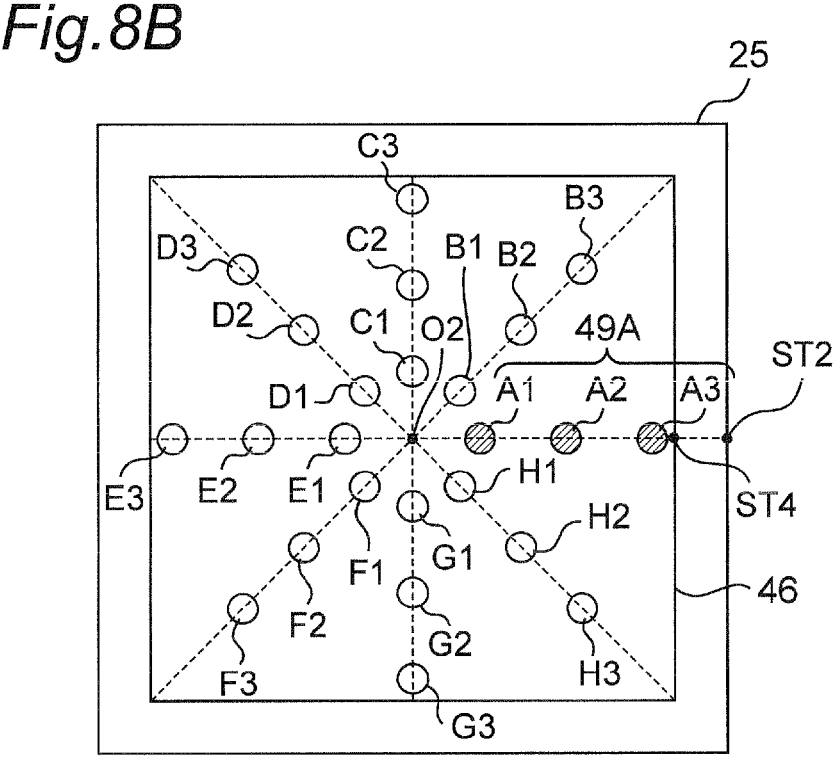
FIG. 8B is a plan view showing the application integrated circuit 25 and the imaging process integrated circuit 46 when the rotation angle θ3 of the camera part 31 of FIG. 1 is 15 degrees, and the rotation angle θ4 of the imaging process integrated circuit 46 is zero degrees.
Figure 9A:
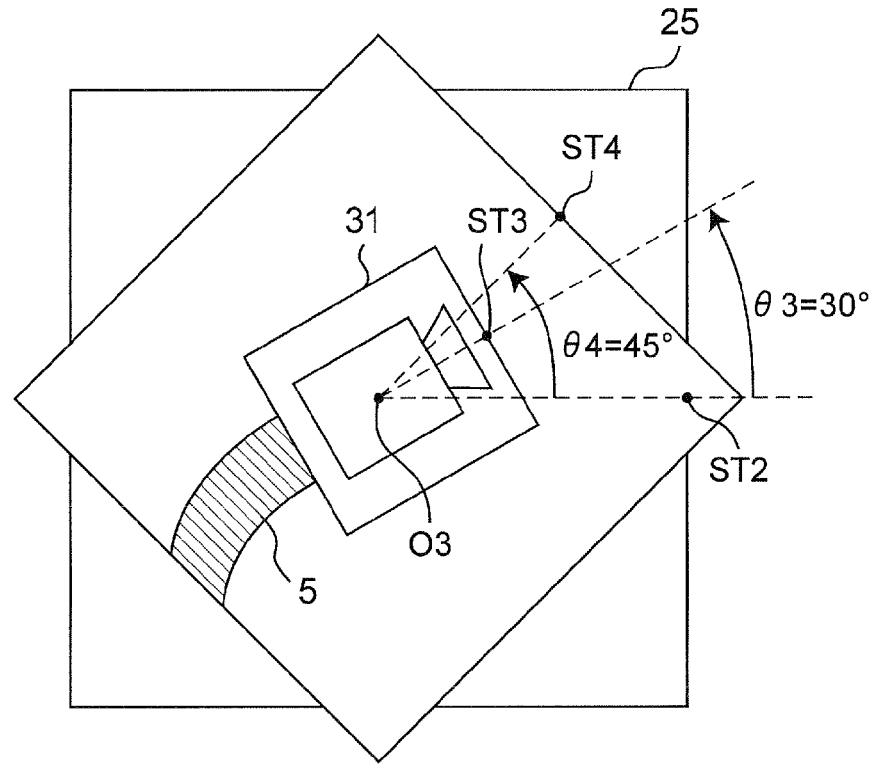
FIG. 9A is a plan view showing the application integrated circuit 25, the imaging process integrated circuit 46, the camera part 31, and the flexible cable 5 when the rotation angle θ3 of the camera part 31 of FIG. 1 is 30 degrees, and the rotation angle θ4 of the imaging process integrated circuit 46 is 45 degrees.
Figure 9B:
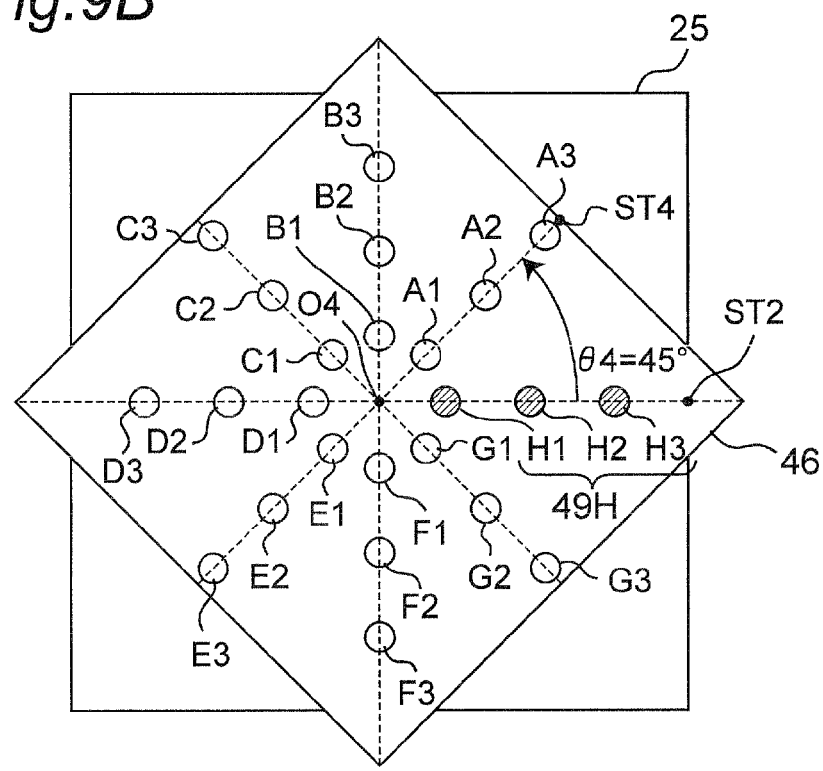
FIG. 9B is a plan view showing the application integrated circuit 25 and the imaging process integrated circuit 46 when the rotation angle θ3 of the camera part 31 of FIG. 1 is 30 degrees, and the rotation angle θ4 of the imaging process integrated circuit 46 is 45 degrees.
Figure 10A:
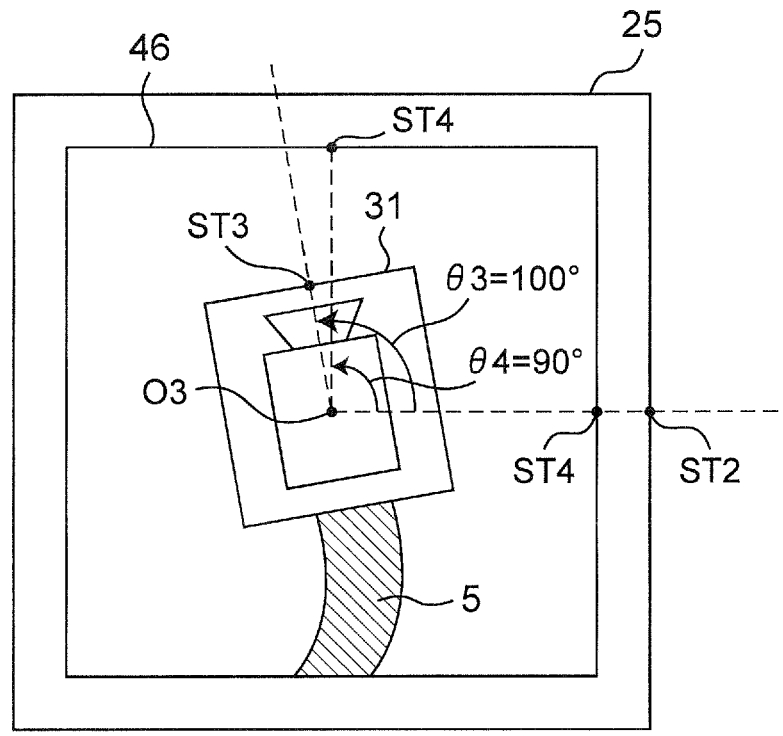
FIG. 10A is a plan view showing the application integrated circuit 25, the imaging process integrated circuit 46, the camera part 31, and the flexible cable 5 when the rotation angle θ3 of the camera part 31 of FIG. 1 is 100 degrees, and the rotation angle θ4 of the imaging process integrated circuit 46 is 90 degrees.
Figure 10B:
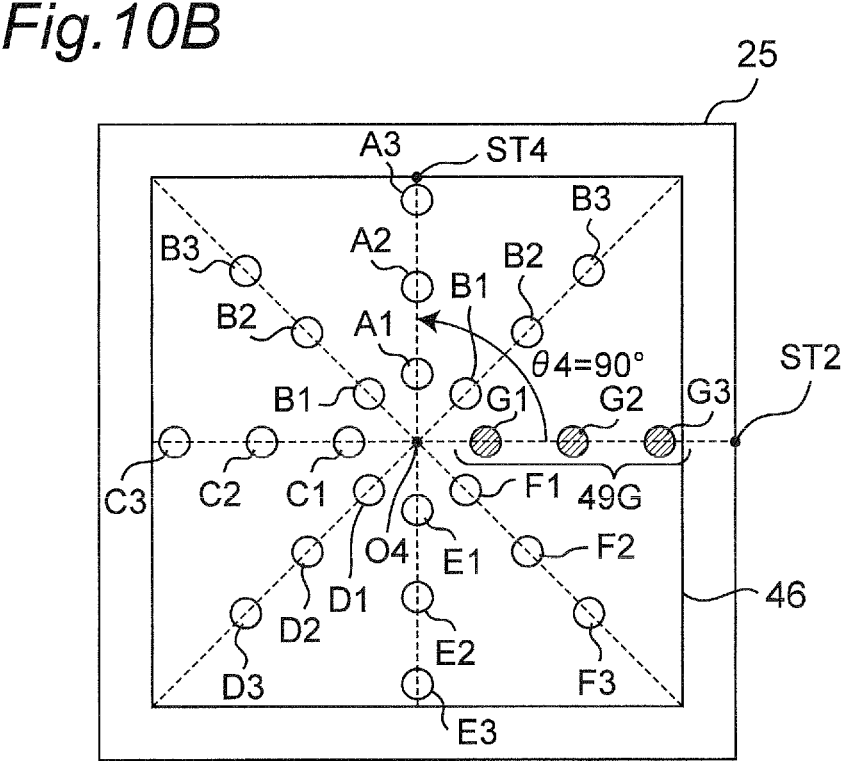
FIG. 10B is a plan view showing the application integrated circuit 25 and the imaging process integrated circuit 46 when the rotation angle θ3 of the camera part 31 of FIG. 1 is 100 degrees, and the rotation angle θ4 of the imaging process integrated circuit 46 is 90 degrees.
Figure 11A:
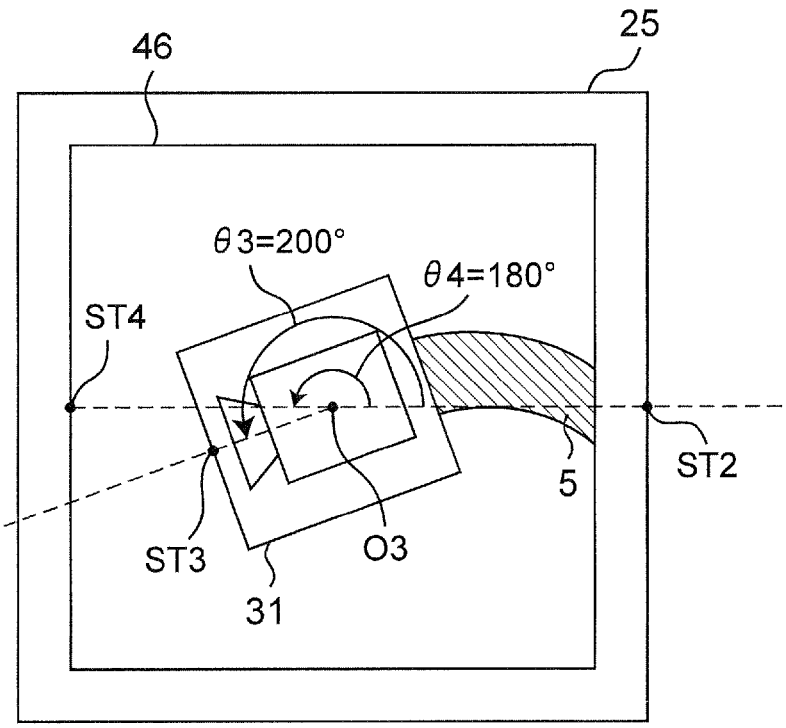
FIG. 11A is a plan view showing the application integrated circuit 25, the imaging process integrated circuit 46, the camera part 31, and the flexible cable 5 when the rotation angle θ3 of the camera part 31 of FIG. 1 is 200 degrees, and the rotation angle θ4 of the imaging process integrated circuit 46 is 180 degrees.
Figure 11B:
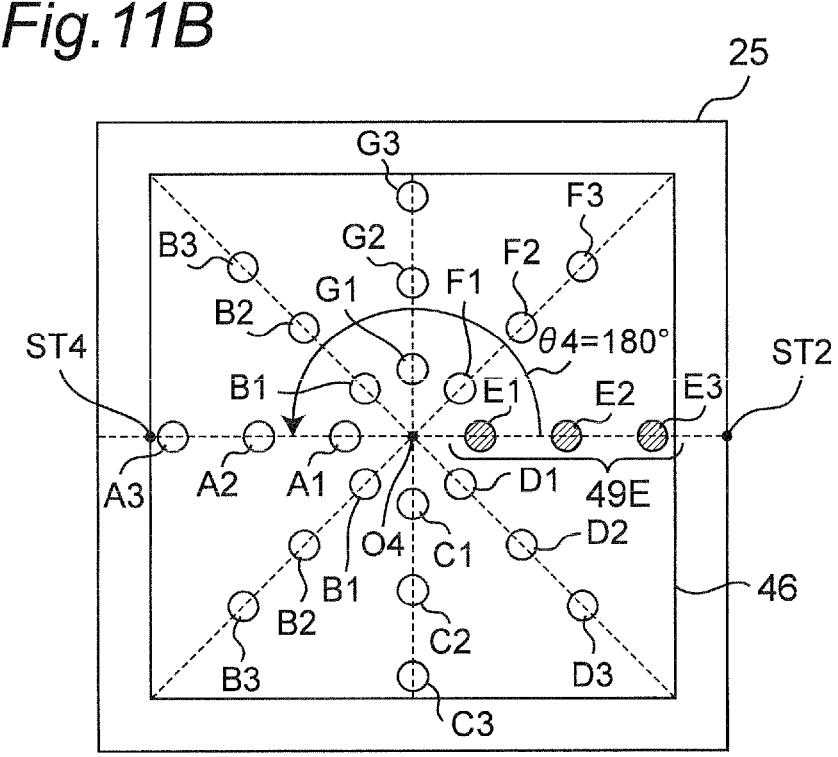
FIG. 11B is a plan view showing the application integrated circuit 25 and the imaging process integrated circuit 46 when the rotation angle θ3 of the camera part 31 of FIG. 1 is 200 degrees, and the rotation angle θ4 of the imaging process integrated circuit 46 is 180 degrees.
Figure 12A:
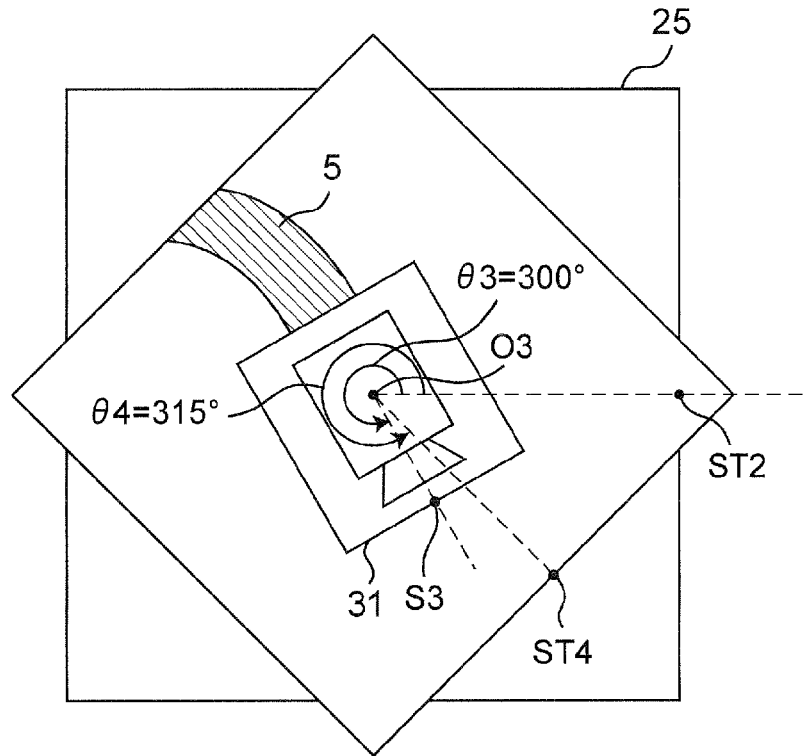
FIG. 12A is a plan view showing the application integrated circuit 25, the imaging process integrated circuit 46, the camera part 31, and the flexible cable 5 when the rotation angle θ3 of the camera part 31 of FIG. 1 is 300 degrees, and the rotation angle θ4 of the imaging process integrated circuit 46 is 315 degrees.
Figure 12B:
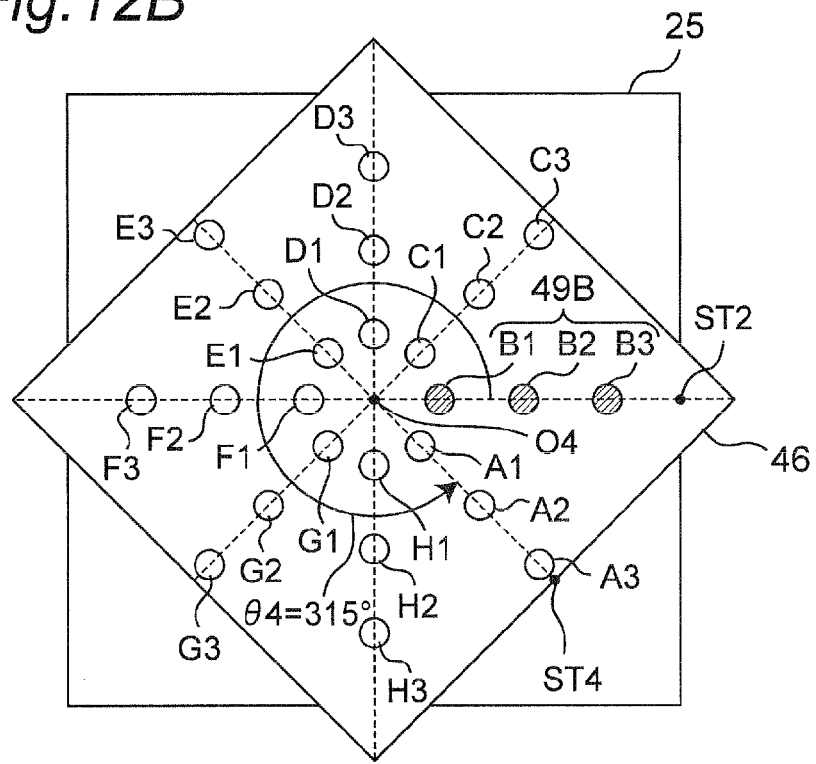
FIG. 12B is a plan view showing the application integrated circuit 25 and the imaging process integrated circuit 46 when the rotation angle θ3 of the camera part 31 of FIG. 1 is 300 degrees, and the rotation angle θ4 of the imaging process integrated circuit 46 is 315 degrees.

Next, with reference to FIGS. 8A and 8B to FIGS. 12A and 12B, concrete examples of the rotation angle θ3 of the camera part 31 and the rotation angle θ4 of the imaging process integrated circuit 46 are shown. FIGS. 8A and 8B to FIGS. 12A and 12B show perspective views when the imaging process integrated circuit 46 is seen from the positive direction of the Z axis in perspective. As shown in FIGS. 8A and 8B, when the rotation angle θ3 of the camera part 31 is 15 degrees, the rotation angle θ4 of the imaging process integrated circuit 46 is set to zero degrees, and the induction coils A1, A2 and A3 oppose to the induction coils R1, R2 and R3, respectively. As shown in FIGS. 9A and 9B, when the rotation angle θ3 of the camera part 31 is 30 degrees, the rotation angle θ4 of the imaging process integrated circuit 46 is set to 45 degrees, and the induction coils H1, H2 and H3 oppose to the induction coils R1, R2 and R3, respectively. Further, as shown in FIGS. 10A and 10B, when the rotation angle θ3 of the camera part 31 is 100 degrees, the rotation angle θ4 of the imaging process integrated circuit 46 is set to 90 degrees, and the induction coils G1, G2 and G3 oppose to the induction coils R1, R2 and R3, respectively. Still further, as shown in FIGS. 11A and 11B, when the rotation angle θ3 of the camera part 31 is 200 degrees, the rotation angle θ4 of the imaging process integrated circuit 46 is set to 180 degrees, and the induction coils E1, E2 and E3 oppose to the induction coils R1, R2 and R3, respectively. As shown in FIGS. 12A and 12B, when the rotation angle θ3 of the camera part 31 is 300 degrees, the rotation angle θ4 of the imaging process integrated circuit 46 is set to 315 degrees, and the induction coils B1, B2 and B3 oppose to the induction coils R1, R2 and R3, respectively. Referring to FIGS. 8A and 8B to FIGS. 12A and 12B, the rotation angle θ3 of the camera part 31 and the rotation angle θ4 of the imaging process integrated circuit 46 are different from each other. However, according to the present preferred embodiment, the maximum value of the magnitude of the difference between the rotation angles θ3 and θ4 is 22.5 degrees, and the flexible cable 5 has the sufficient and shortest length so that neither disconnection nor twisting occurs even if the magnitude of the difference between the rotation angles θ3 and θ4 is 22.5 degrees. Therefore, the difference between the rotation angles θ3 and θ4 can be absorbed by the flexible cable 5.

As described above, according to the present preferred embodiment, the controller 47 selects one of the plurality of array antennas 49A to 49H provided at the movable housing 4, and controls the driving apparatus 35 to oppose selected array antenna to the array antenna 28 provided for the fixed housing 2, so as to perform the proximity wireless communications between the proximity wireless communication circuit 463 of the movable housing 4 and the proximity wireless communication circuit 251 of the fixed housing 2 via the selected array antenna and the array antenna 28. Therefore, the movable housing 4 can be rotated endlessly on the fixed housing 2. In addition, since the proximity wireless communications are performed by using the wireless TSV, the data transfer speed can be raised to a level equivalent to the data transfer speed of wired communications and the camera apparatus of the present preferred embodiment can be realized at a cost lower than that of the prior art. Therefore, according to the present preferred embodiment, high-definition video data can be transferred between the proximity wireless communication circuit 463 and the proximity wireless communication circuit 251.

In addition, according to the present preferred embodiment, the camera part 31 is provided at the movable housing 3 separately from the movable housing 4, the camera part 31 is wirely connected to the proximity wireless communication circuit 463, and one array antenna is selected from among the array antennas 49A to 49H so that the magnitude of the difference between the rotation angle θ3 of the movable housing 3 and the rotation angle θ4 of the movable housing 4 becomes the minimum based on the rotation angle θ3 of the movable housing 3. Therefore, although the movable housing 4 is endlessly rotated in the angular units of Δθ4 (45 degrees in the present preferred embodiment), the movable housing 3 can be rotated at an arbitrary rotation angle θ3, and the camera part 31 can be directed in an arbitrary pan direction. Further, the camera part 31 can be continuously and endlessly rotated on the fixed housing 2.

In the present preferred embodiment, the controller 47 controls the motor 33 to rotate the camera part 31 at the predetermined rotating speed in the endless rotation mode, however, the present invention is not limited to this. The motor 33 may be controlled to rotate the camera part 31 in predetermined steps. Concretely speaking, for example, the motor 33 may be controlled to repeat an operation of rotate the camera part 31 by a predetermined rotation angle (e.g., 30 degrees) and thereafter, fixing the camera part 31 without rotation for a predetermined period (e.g., ten seconds).

First Modified Preferred Embodiment of First Preferred Embodiment

Figure 13:
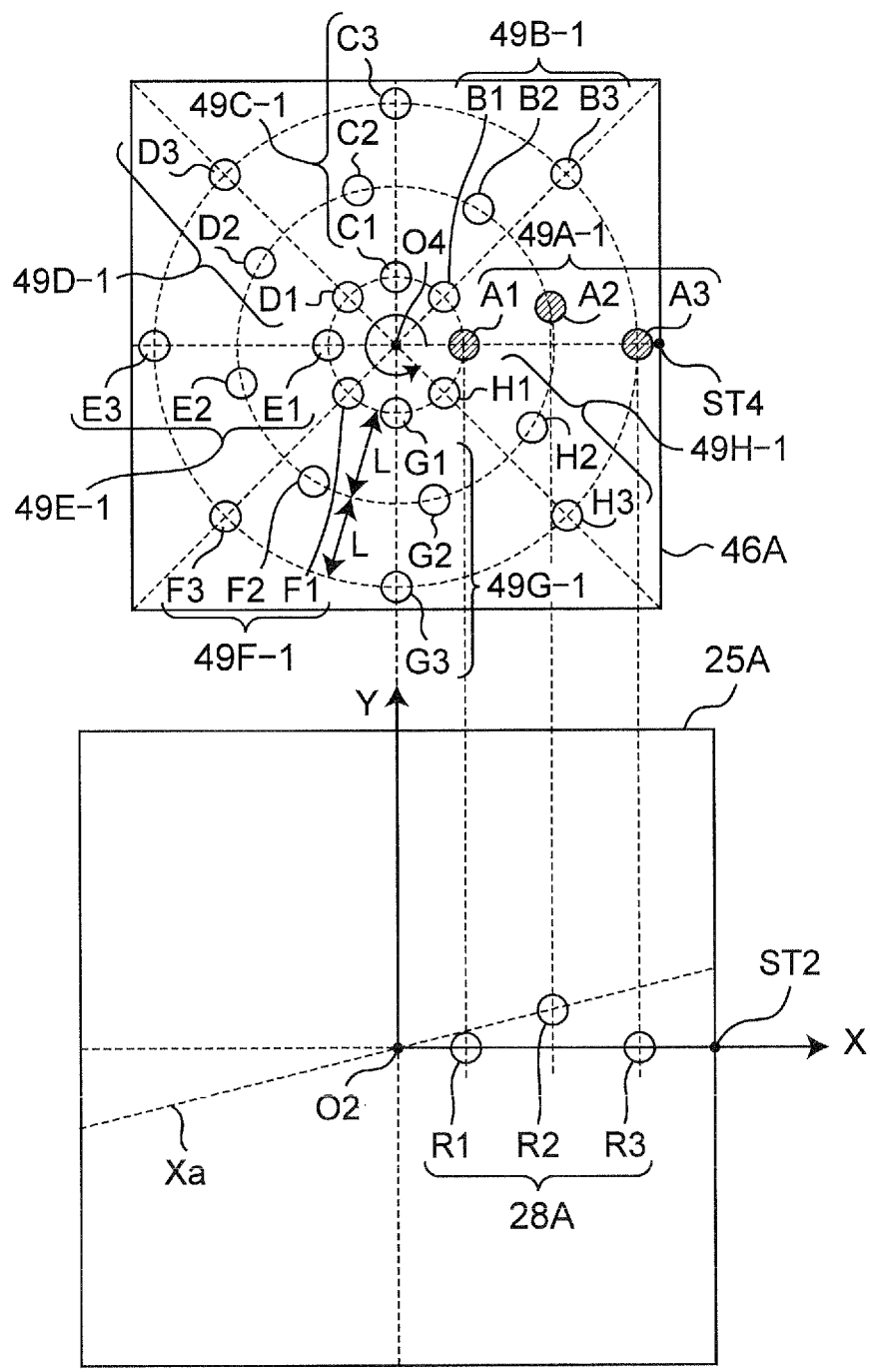
FIG. 13 is a plan view showing array antennas 49A-1 to 49H-1 formed on an imaging process integrated circuit 46A and an array antenna 28A formed on an application integrated circuit 25A according to a first modified preferred embodiment of the first preferred embodiment of the present invention.

In the first preferred embodiment, the induction coils R1, R2 and R3 of the array antenna 28 formed on the application integrated circuit 25 are arranged on a straight line (on the X axis) perpendicular to the rotation axis 21 (See FIG. 5), however, the present invention is not limited to this, and the coils R1, R2 and R3 may be arranged in an arbitrary configuration. FIG. 13 is a plan view showing array antennas 49A-1 to 49H-1 formed on an imaging process integrated circuit 46A and an array antenna 28A formed on an application integrated circuit 25A according to the first modified preferred embodiment of the first preferred embodiment of the present invention. Referring to FIG. 13, the array antenna 28A is formed on the upper surface of the application integrated circuit 25A of the present modified preferred embodiment. The array antenna 28A is configured to include three induction coils R1, R2 and R3 arranged at vertices of a triangular, respectively. In this case, the induction coils R1 and R3 are formed on the X axis, while the induction coil R2 is formed on a straight line Xa perpendicular to the rotation axis 21. In addition, the array antennas 49A-1 to 49H-1 are formed on the lower surface of the imaging process integrated circuit 46A of the present modified preferred embodiment so that the array antennas 49A-1 to 49H-1 oppose to the array antenna 28A when the imaging process integrated circuit 46A is rotated from the reference position thereof by zero degrees, 45 degrees, 90 degrees, 135 degrees, 180 degrees, 225 degrees, 270 degrees, and 315 degrees, respectively.

Although the element interval of the array antenna 28 is L in the first preferred embodiment, the element interval can be made longer than L without increasing the area of the application integrated circuit 25A in the case of the array antenna 28A of the present modified preferred embodiment. Therefore, interferences among the induction coils R1, R2 and R3 can be made smaller than in the first preferred embodiment.

Second Modified Preferred Embodiment of First Preferred Embodiment

Figure 14:
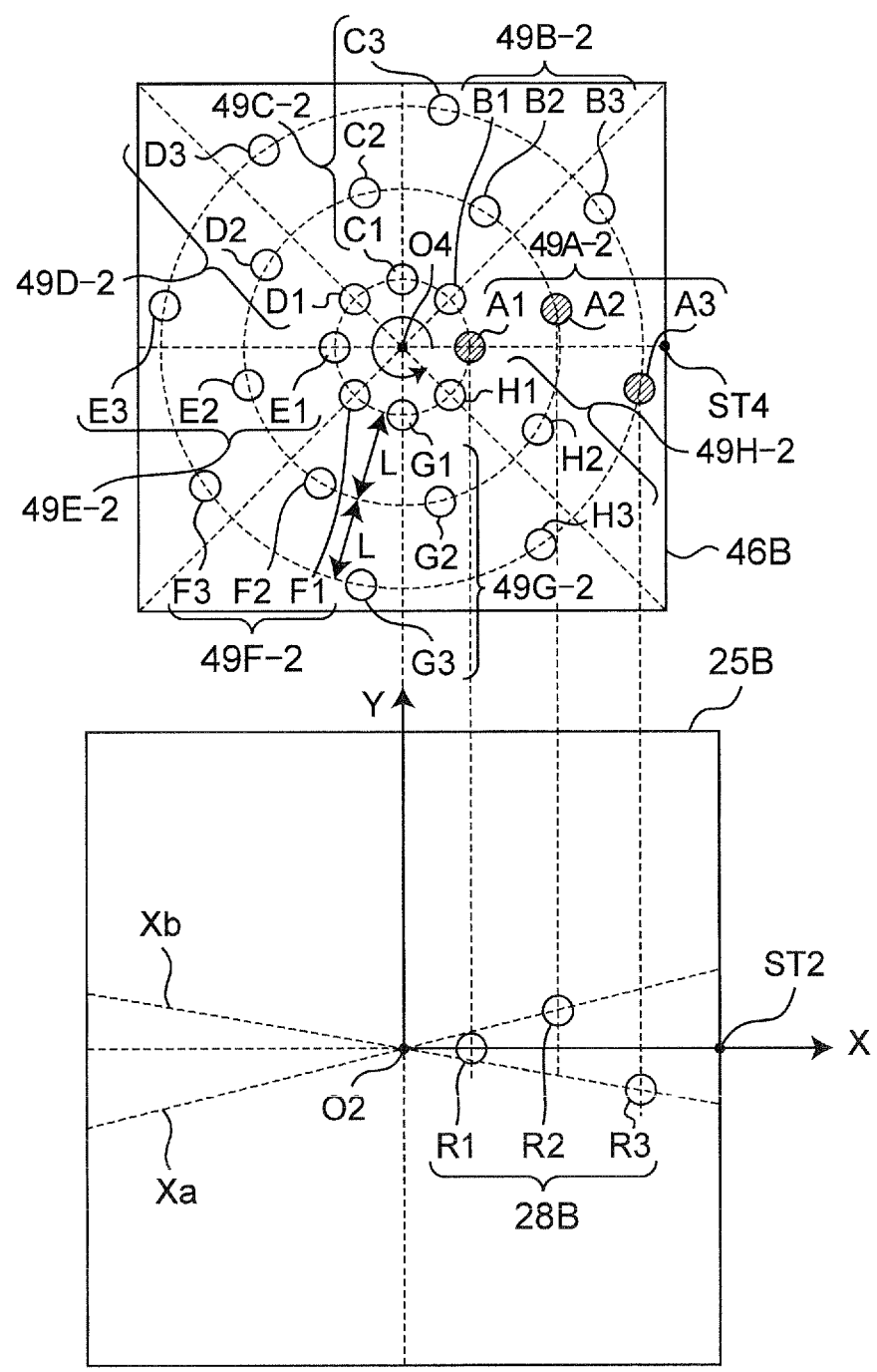
FIG. 14 is a plan view showing array antennas 49A-2 to 49H-2 formed on an imaging process integrated circuit 46B and an array antenna 28B formed on an application integrated circuit 25B according to a second modified preferred embodiment of the first preferred embodiment of the present invention.

FIG. 14 is a plan view showing array antennas 49A-2 to 49H-2 formed on an imaging process integrated circuit 46B and an array antenna 28B formed on an application integrated circuit 25B according to the second modified preferred embodiment of the first preferred embodiment of the present invention. Referring to FIG. 14, the array antenna 28B is formed on the upper surface of the application integrated circuit 25B of the present modified preferred embodiment. The array antenna 28B is configured to include three induction coils R1, R2 and R3 arranged at vertices of a triangular shape, respectively. In this case, the induction coil R1 is formed on the X axis, the induction coil R2 is formed on a straight line Xa perpendicular to the rotation axis 21, and the induction coil R3 is formed on a straight line Xb perpendicular to the rotation axis 21. In addition, the array antennas 49A-2 to 49H-2 are formed on the lower surface of the imaging process integrated circuit 46B of the present modified preferred embodiment so that the array antennas 49A-2 to 49H-2 oppose to the array antenna 28B when the imaging process integrated circuit 46B is rotated from the reference position by zero degrees, 45 degrees, 90 degrees, 135 degrees, 180 degrees, 225 degrees, 270 degrees, and 315 degrees, respectively. The present modified preferred embodiment exhibits action and advantageous effects similar to those of the first modified preferred embodiment of the first preferred embodiment.

Third Modified Preferred Embodiment of First Preferred Embodiment

Figure 15:
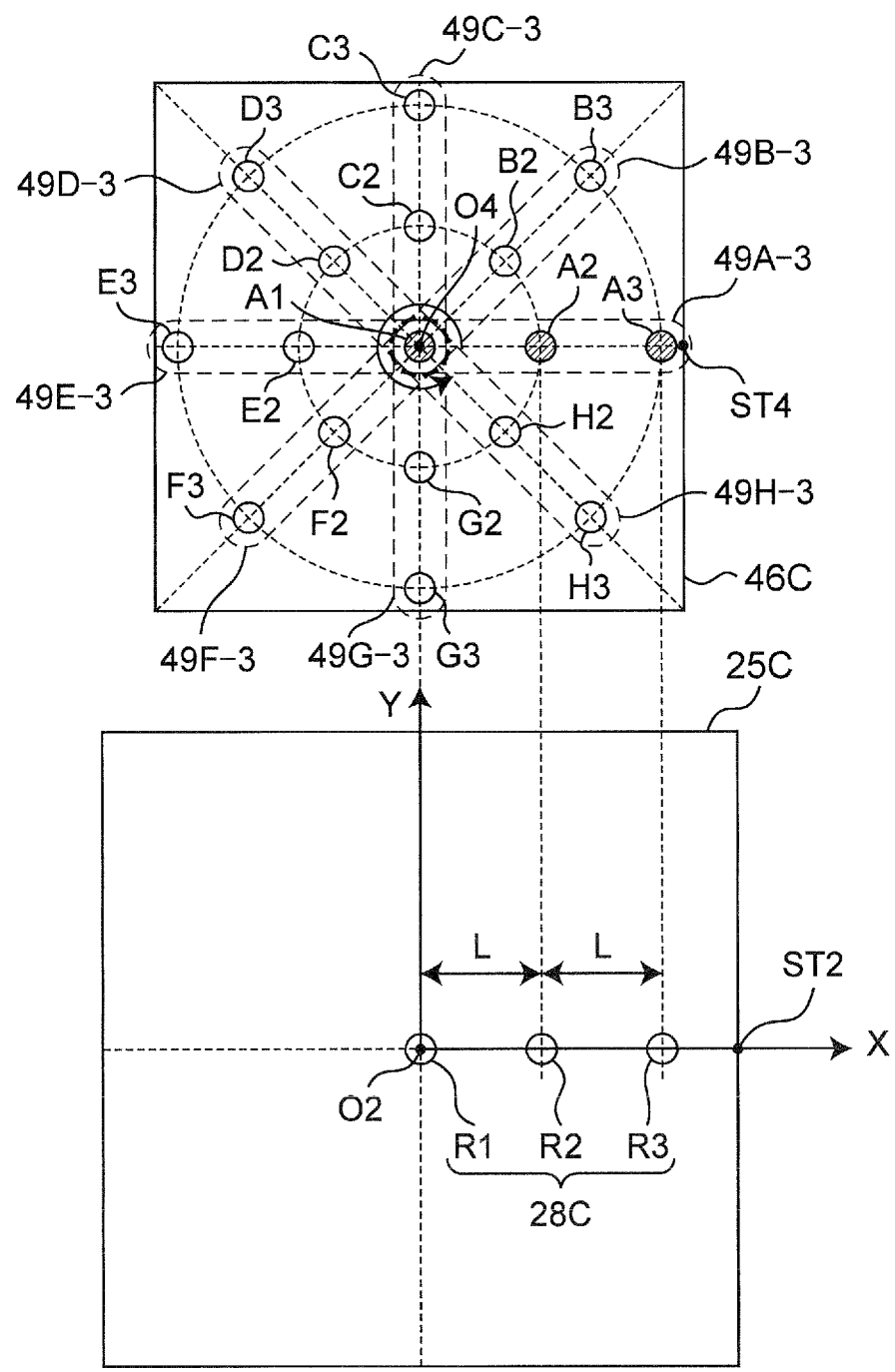
FIG. 15 is a plan view showing array antennas 49A-3 to 49H-3 formed on an imaging process integrated circuit 46C and an array antenna 28C formed on an application integrated circuit 25C according to a third modified preferred embodiment of the first preferred embodiment of the present invention.

FIG. 15 is a plan view showing array antennas 49A-3 to 49H-3 formed on an imaging process integrated circuit 46C and an array antenna 28C formed on an application integrated circuit 25C according to the third modified preferred embodiment of the first preferred embodiment of the present invention. Referring to FIG. 15, the array antenna 28C is formed on the upper surface of the application integrated circuit 25C. The array antenna 28C is different from the array antenna 28 of the first preferred embodiment in that the induction coil R1 is placed at the origin O2 (i.e., on the rotation axis 21). Namely, the induction coils R1, R2 and R3 are formed at an element interval L on the X axis. In addition, the array antennas 49A-3 to 49H-3 are formed on the lower surface of the imaging process integrated circuit 46C of the present modified preferred embodiment so that the array antennas 49A-3 to 49H-3 oppose to the array antenna 28C when the imaging process integrated circuit 46C is rotated from the reference position by zero degrees, 45 degrees, 90 degrees, 135 degrees, 180 degrees, 225 degrees, 270 degrees, and 315 degrees, respectively. In this case, the induction coil A1 is provided at the center of rotation O4 and shared by the array antennas 49A-3 to 49H-3. It is noted that two circular grooves are formed by removing the rotation axis 21 from the fixed housing 2, and the movable housings 3 and 4 are slidably fitted in the grooves, so that the induction coil A1 can be formed at the center of rotation O4 of the imaging process integrated circuit 46C. Alternatively, the rotation axis 21 is formed in a cylindrical shape so that the induction coil A1 can be formed at the center of rotation 04 of the imaging process integrated circuit 46C.

According to the present modified preferred embodiment, the induction coil R1 and the induction coil A1 consistently oppose to each other, and therefore, the clock signal can be continuously transmitted via the induction coil R1 and the induction coil A1. Therefore, wireless communications can be stably performed between the proximity wireless communication circuits 463 and 251 than in the first preferred embodiment. In addition, since the induction coil A1 is shared by the array antennas 49A-3 to 49H-3, the imaging process integrated circuit 46C can be manufactured at lower cost than that of the first preferred embodiment.

Fourth Modified Preferred Embodiment of First Preferred Embodiment

Figure 16:
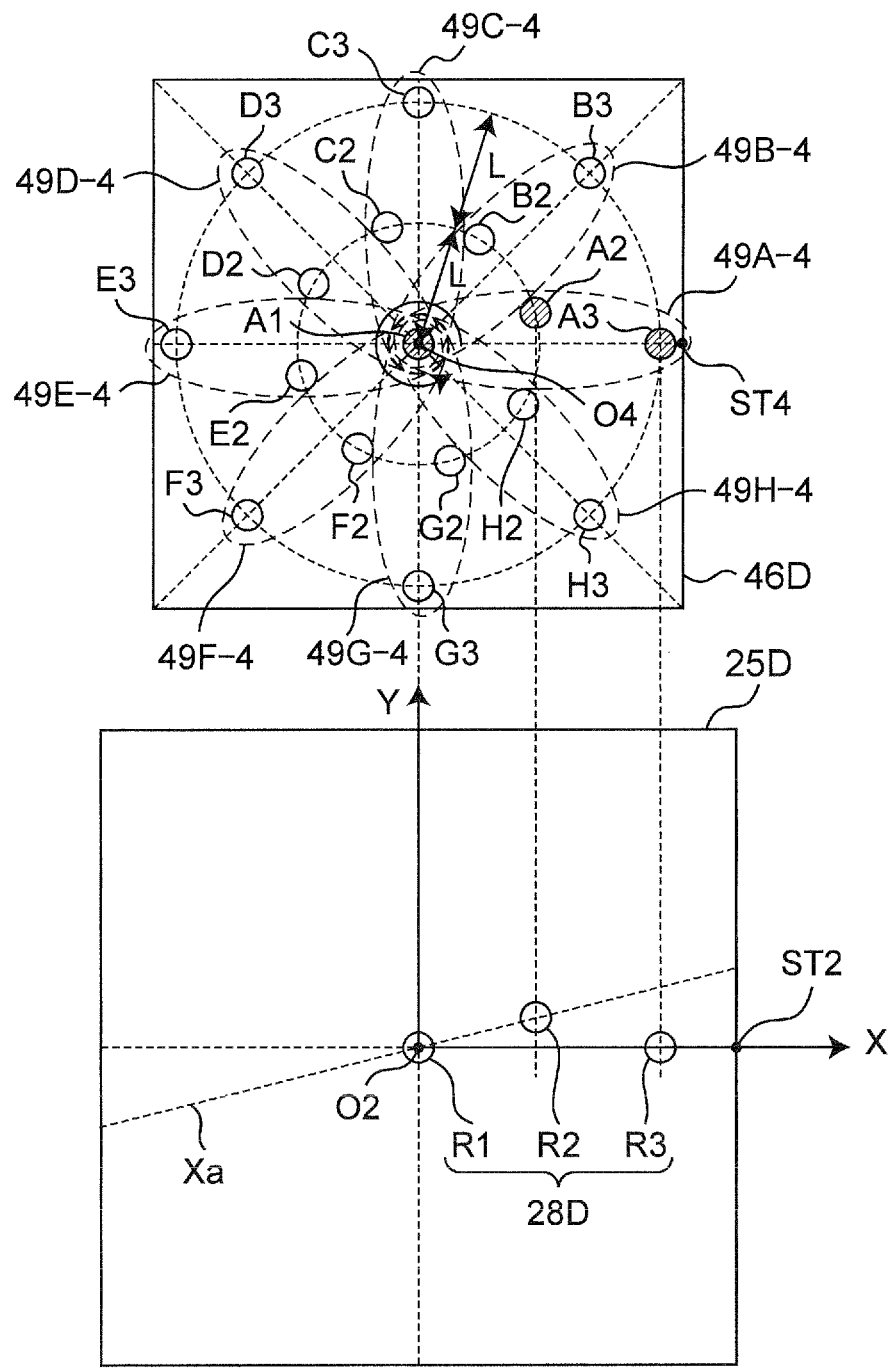
FIG. 16 is a plan view showing array antennas 49A-4 to 49H-4 formed on an imaging process integrated circuit 46D and an array antenna 28D formed on an application integrated circuit 25D according to a fourth modified preferred embodiment of the first preferred embodiment of the present invention.

FIG. 16 is a plan view showing array antennas 49A-4 to 49H-4 formed on an imaging process integrated circuit 46D and an array antenna 28D formed on an application integrated circuit 25D according to the fourth modified preferred embodiment of the first preferred embodiment of the present invention. Referring to FIG. 16, the array antenna 28D is formed on the upper surface of the application integrated circuit 25D of the present modified preferred embodiment. The array antenna 28D is configured to include three induction coils R1, R2 and R3 arranged at vertices of a triangular shape, respectively. In this case, the induction coils R1 and R3 are formed on the X axis, while the induction coil R2 is formed on a straight line Xa perpendicular to the rotation axis 21. Further, the induction coil R1 is formed at the origin O2. In addition, the array antennas 49A-4 to 49H-4 are formed on the lower surface of the imaging process integrated circuit 46D of the present modified preferred embodiment so that the array antennas 49A-4 to 49H-4 oppose to the array antenna 28D when the imaging process integrated circuit 46D is rotated from the reference position by zero degrees, 45 degrees, 90 degrees, 135 degrees, 180 degrees, 225 degrees, 270 degrees, and 315 degrees, respectively.

Although the element interval of the array antenna 28C is L in the third modified preferred embodiment of the first preferred embodiment, the element interval can be made longer than L without increasing the area of the application integrated circuit 25D in the case of the array antenna 28D of the present modified preferred embodiment. Therefore, interferences among the induction coils R1, R2 and R3 can be made smaller than in the third modified preferred embodiment of the first preferred embodiment.

Fifth Modified Preferred Embodiment of First Preferred Embodiment

Figure 17:
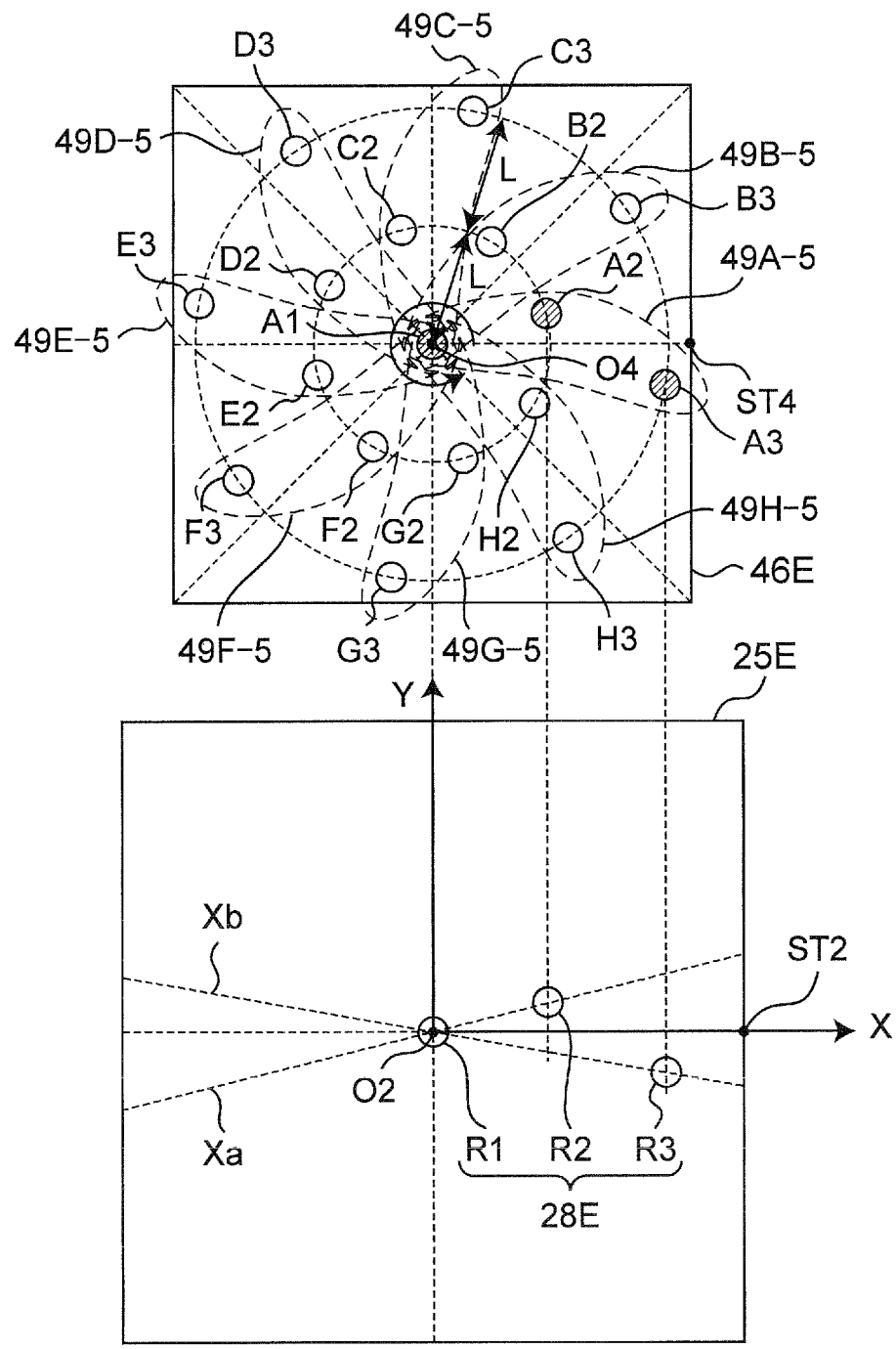
FIG. 17 is a plan view showing array antennas 49A-5 to 49H-5 formed on an imaging process integrated circuit 46E and an array antenna 28E formed on an application integrated circuit 25E according to a fifth modified preferred embodiment of the first preferred embodiment of the present invention.

FIG. 17 is a plan view showing array antennas 49A-5 to 49H-5 formed on an imaging process integrated circuit 46E and an array antenna 28E formed on an application integrated circuit 25E according to the fifth modified preferred embodiment of the first preferred embodiment of the present invention. Referring to FIG. 17, the array antenna 28E is formed on the upper surface of the application integrated circuit 25E of the present modified preferred embodiment. The array antenna 28E is configured to include three induction coils R1, R2 and R3 arranged at vertices of a triangular shape, respectively. In this case, the induction coil R1 is formed at the origin O2, the induction coil R2 is formed on a straight line Xa perpendicular to the rotation axis 21, and the induction coil R3 is formed on a straight line Xb perpendicular to the rotation axis 21. In addition, the array antennas 49A-5 to 49H-5 are formed on the lower surface of the imaging process integrated circuit 46E of the present modified preferred embodiment so that the array antennas 49A-5 to 49H-5 oppose to the array antenna 28E when the imaging process integrated circuit 46E is rotated from the reference position by zero degrees, 45 degrees, 90 degrees, 135 degrees, 180 degrees, 225 degrees, 270 degrees, and 315 degrees, respectively. The present modified preferred embodiment exhibits action and advantageous effects similar to those of the fourth modified preferred embodiment of the first preferred embodiment.

Sixth Modified Preferred Embodiment of First Preferred Embodiment

In the first preferred embodiment, the angular interval $\Delta\theta 4$ of the array antennas 49A to 49H is 45 degrees, however, the present invention is not limited to this. The angular interval $\Delta\theta 4$ is only required to be a positive divisor N of 360 other than 360 degrees. In this case, M (=360/N) array antennas 28 are formed on the imaging process integrated circuit 46 so that each of the M array antennas opposes to the array antenna 28 when the imaging process integrated circuit 46 is rotated at angular intervals $\Delta\theta 4$ (=N). In addition, the controller 47 determines the rotation angle $\theta 4$ so that the magnitude of the difference $|\theta 3-\theta 4|$ between the rotation angle $\theta 3$ and the rotation angle $\theta 4$ becomes equal to or smaller than $\Delta\theta 4/2$. Further, the length of the flexible cable 5 is set to a length required to rotate the movable housings 3 and 4 mutually independently. Concretely speaking, the length of the flexible cable 5 is set so that neither disconnection nor twisting occurs even if the magnitude of the difference $|\theta 3-\theta 4|$ between the rotation angle $\theta 3$ and the rotation angle $\theta 4$ is $\Delta\theta 4/2$.

Figure 18:
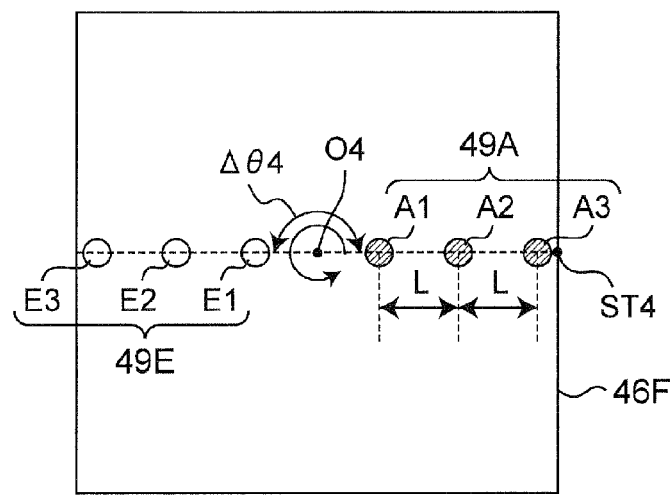
FIG. 18 is a plan view showing array antennas 49A and 49E formed on an imaging process integrated circuit 46F according to a sixth modified preferred embodiment of the first preferred embodiment of the present invention.

FIG. 18 is a plan view showing the array antennas 49A and 49E formed on an imaging process integrated circuit 46F according to the sixth modified preferred embodiment of the first preferred embodiment of the present invention. In the present modified preferred embodiment, the angular interval $\Delta\theta 4$ of the array antennas 49A and 49E is 180 degrees, and only the two array antennas 49A and 49E are formed on the imaging process integrated circuit 46B.

In addition, in the first preferred embodiment, the array antennas 49A to 49H are arranged at equal intervals around the rotation axis 21, however, the present invention is not limited to this. The array antennas 49A to 49H may be arranged at non-equal intervals. Also in this case, the controller 47 determines the rotation angle $\theta 4$ so that the magnitude of the difference $|\theta 3-\theta 4|$ between the rotation angle $\theta 3$ and the rotation angle $\theta 4$ becomes the minimum.

In the first preferred embodiment and the modified preferred embodiments thereof, the controller 47 determines the rotation angle $\theta 4$ with reference to the array antenna selection table 47t based on the rotation angle $\theta 3$, however, the present invention is not limited to this. The rotation angle $\theta 4$ may be calculated based on the rotation angle $\theta 3$ so that the magnitude of the difference $|\theta 3-\theta 4|$ between the rotation angle $\theta 3$ and the rotation angle $\theta 4$ becomes the minimum.

In addition, in the first preferred embodiment and the modified preferred embodiments thereof, the number of induction coils that constitute the array antennas 28A to 28E is three, however, the present invention is not limited to this. The number may be two or equal to or larger than four. By increasing the number of induction coils that constitute the array antennas 28A to 28E, the data transfer speed between the imaging process integrated circuits 46A to 46E and the application integrated circuits 25A to 25E can be increased.

In addition, each of the modified preferred embodiments of the first preferred embodiment is applied also to the following second and third preferred embodiments described later.

Second Preferred Embodiment

Figure 19:
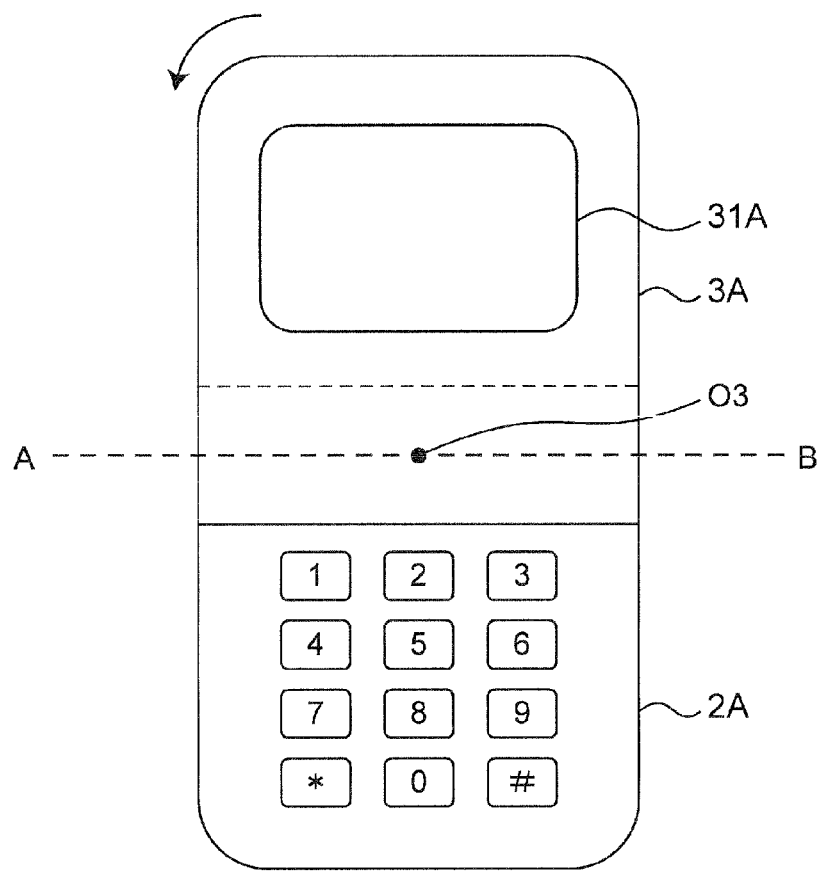
FIG. 19 is a plan view of a portable telephone apparatus 1A according to a second preferred embodiment of the present invention.
Figure 20:
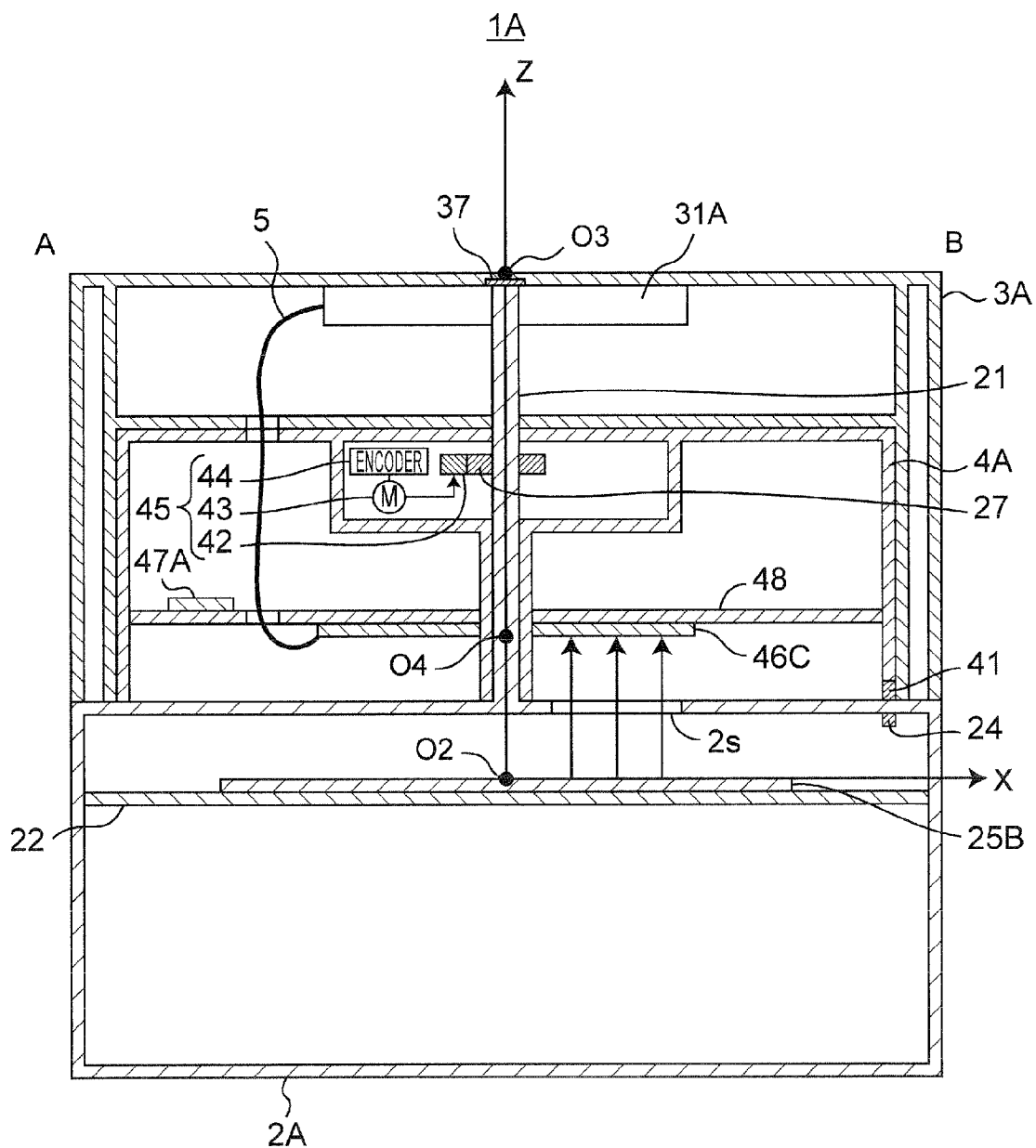
FIG. 20 is a sectional view along a line A-B of the portable telephone apparatus 1A of FIG. 19.
Figure 21:
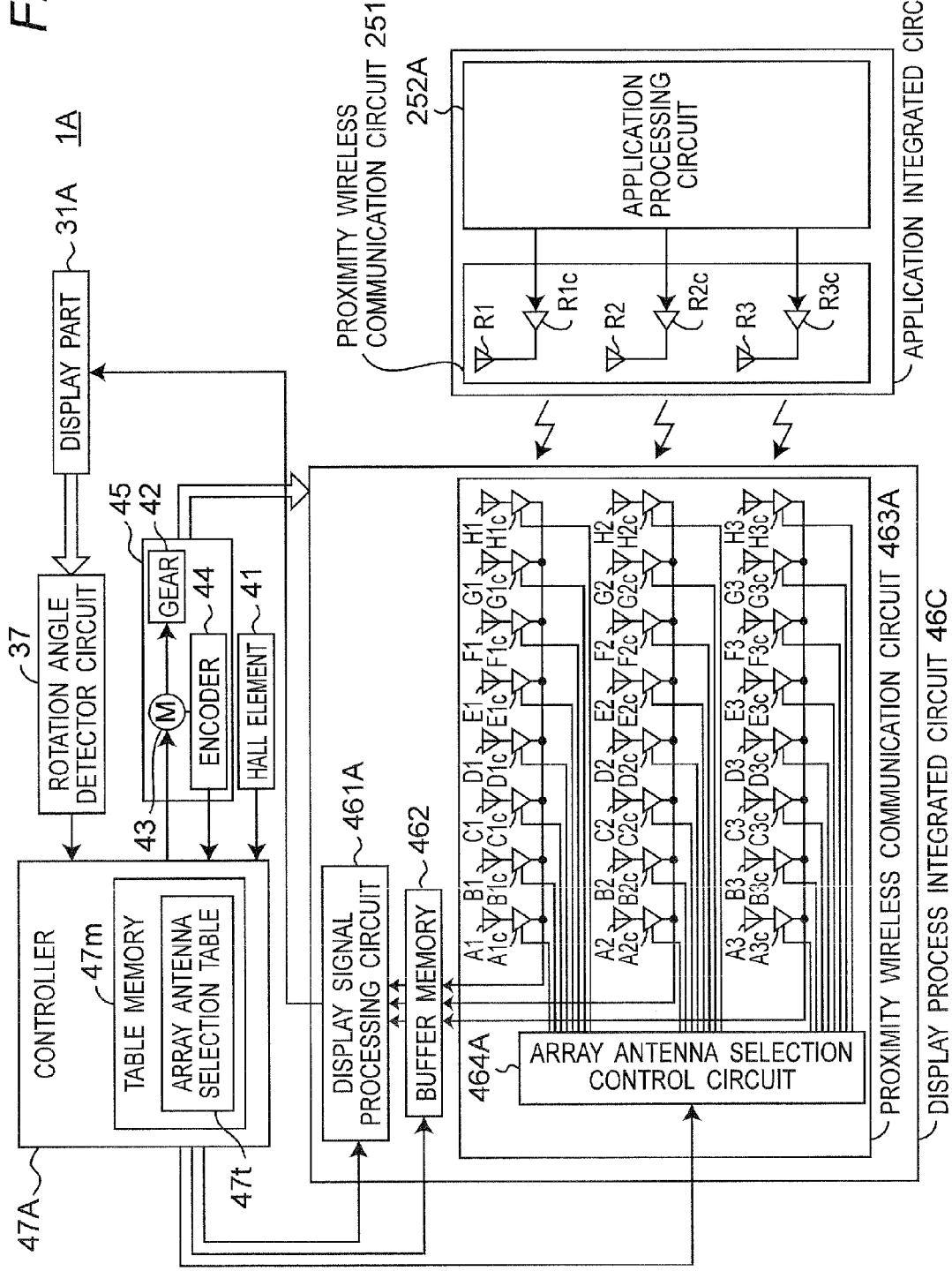
FIG. 21 is block diagram showing a configuration of the portable telephone apparatus 1A of FIG. 19.

FIG. 19 is a plan view of a portable telephone apparatus 1A according to the second preferred embodiment of the present invention, and FIG. 20 is a sectional view along a line A-B of the portable telephone apparatus 1A of FIG. 19. FIG. 21 is block diagram showing a configuration of the portable telephone apparatus 1A of FIG. 19. Although the video data is outputted from the movable housing 3 to the fixed housing 2 in the first preferred embodiment described above, the video data is outputted from a fixed housing 2A to a movable housing 3A in the present preferred embodiment.

Referring to FIGS. 19 and 20, the portable telephone apparatus 1A is configured to include the fixed housing 2A having a rotation axis 21, the movable housing 3A that is slidably and rotatably supported to the rotation axis 21, and a movable housing 4A that is slidably and rotatably supported to the rotation axis 21. In this case, a gear 27 is fixed to the rotation axis 21. In addition, a dielectric substrate 22 is fixed inside the fixed housing 2A at an angle perpendicular to the rotation axis 21, and an application integrated circuit 25B that is an LSI formed of one silicon device on the upper surface of the dielectric substrate 22. An array antenna 28 including induction coils R1, R2 and R3 is formed on the application integrated circuit 25B in a manner similar to that of the first preferred embodiment. Further, a magnet 24 is provided inside the fixed housing 2A.

In addition, referring to FIG. 20, a display part 31A that is electronic equipment to display digital video data is fixed on an upper portion of the movable housing 3A. A rotation angle detector circuit 37 for detecting the rotation angle θ3 of the movable housing 3A is provided inside the movable housing 3A.

Further, referring to FIG. 20, a dielectric substrate 48 is fixed inside the movable housing 4A at an angle perpendicular to the rotation axis 21, a controller 47A is mounted on the upper surface of the dielectric substrate 48, and a display process integrated circuit 46C that is an LSI formed of one silicon device is mounted on the lower surface of the dielectric substrate 48. In addition, induction coils A1, A2, A3, B1, B2, . . . , H1, H2 and H3 are formed on the display process integrated circuit 46C in a manner similar to that of the first preferred embodiment. Further, a driving apparatus 45 to endlessly rotate the movable housing 4A in a direction counterclockwise about the rotation axis 21 is provided inside the movable housing 4A in a manner similar to that of the first preferred embodiment. In addition, a Hall element 41 is provided at the movable housing 4A to oppose to the magnet 24 when the display process integrated circuit 46C is located in a predetermined reference position thereof. In the present preferred embodiment, a cylindrical coordinate system including the center of rotation O3 of the display part 31A, the center of rotation O4 of the display process integrated circuit 46C and the origin O2, the reference position and the rotation angle θ3 of the display part 31A, and the reference position and the rotation angle θ4 of the display process integrated circuit 46C are defined in a manner similar to those of the first preferred embodiment.

Further, as shown in FIGS. 19 to FIG. 21, respective circuits including the display part 31A and the rotation angle detector circuit 37 provided at the movable housing 3A are electrically connected to connecting conductors at an end portion of the display process integrated circuit 46C by using the flexible cable 5 (See FIG. 20). Referring to FIGS. 19 and 20, the display part 31A and the display process integrated circuit 46C rotate mutually independently about the rotation axis 21 in a manner similar to that of the camera part 31 and the imaging process integrated circuit 46 of the first preferred embodiment. The flexible cable 5 has a sufficient and shortest length so that neither disconnection nor twisting occurs even if the positions of both ends of the flexible cable 5 are located apart as a consequence of the mutual independent rotation of the display part 31A and the display process integrated circuit 46C. In addition, each of the stepping motor 43, the encoder 44 and the Hall element 46 is electrically connected to the controller 47A via wiring conductors in the movable housing 4A.

Further, referring to FIG. 20, an electric power is supplied directly from a secondary battery to the respective circuits including the application integrated circuit 25B in the fixed housing 2A. In addition, a slip ring (not shown) is provided between the fixed housing 2A and the movable housings 3A and 4 to supply power from the secondary battery to the respective circuits in the movable housings 3A and 4 via the fixed housing 2A.

In addition, referring to FIG. 21, the application integrated circuit 25B is configured to include a proximity wireless communication circuit 251A and an application processing circuit 252A. In this case, the proximity wireless communication circuit 251A is configured to include induction coils R1, R2 and R3 and transmitting buffers R1c, R2c and R3c connected to the induction coils R1, R2 and R3, respectively. The application processing circuit 252A generates video data, serial-to-parallel converts the video data into two video data according to a predetermined clock signal, and outputs the clock signal and the two video data to each of the transmitting buffers R1c, R2c and R3c. Then, the clock signal and the two video data are wirelessly transmitted to three induction coils of the proximity wireless communication circuit 463A by using the induction coils R1, R2 and R3, where the three induction coils opposing to the induction coils R1, R2 and R3, respectively.

Further, referring to FIG. 21, the display process integrated circuit 46C is configured to include a display signal processing circuit 461A, a buffer memory 462, and a proximity wireless communication circuit 463A. In this case, the proximity wireless communication circuit 463A is configured to include induction coils A1, A2, A3, B1, B2, . . . , H1, H2 and H3, and an array antenna selection control circuit 464A that executes on/off control of receiving buffers A1c, A2c, A3c, B1c, B2c, . . . , H1c, H2c, H3c and transmitting buffers A1c, A2c, A3c, B1c, B2c, . . . , H1c, H2c and H3c, which are connected to the induction coils A1, A2, A3, B1, B2, . . . , H1, H2 and H3, respectively.

Further, referring to FIG. 21, the controller 47A is configured to include a table memory 47m that previously stores an array antenna selection table 47t in a manner similar to that of the controller 47 of the first preferred embodiment. When the user endlessly rotates the movable housing 3A, the controller 47 detects the rotation angle θ3 of the movable housing 3A based on an output signal from the rotation angle detector circuit 37. Then, the controller 47A determines the rotation angle θ4 of the movable housing 4A and three induction coils to be selected with reference to the array antenna selection table 47t based on a detected rotation angle θ3. Further, the controller 47A controls the stepping motor 43 to rotate the display process integrated circuit 46C by the rotation angle θ4, and controls the array antenna selection control circuit 464A to turn on the receiving buffers connected to selected three induction coils. Then, the controller 47A controls the buffer memory 462 to output the clock signal and the video data from the proximity wireless communication circuit 463A to the display signal processing circuit 461A. The display signal processing circuit 461A parallel-to-serial converts the video data into one video data according to the inputted clock signal, and thereafter, outputs a resultant video data to the display part 31A to display the data.

The present preferred embodiment exhibits action and advantageous effects similar to those of the first preferred embodiment.

Third Preferred Embodiment

FIG. 22 is a block diagram showing a configuration of a portable telephone apparatus 1B according to the third preferred embodiment of the present invention. Although the video data is outputted from the application integrated circuit 25A of the fixed housing 2A to the display part 31A of the movable housing 3A in the second preferred embodiment described above, the video data and other signals are transmitted and received bidirectionally between the application integrated circuit 25B of the fixed housing 2A and the touch panel part 31B of the movable housing 3A in the present preferred embodiment.

Referring to FIG. 22, the portable telephone apparatus 1B is constituted by replacing the display part 31A, the controller 47A, the display process integrated circuit 46C and the application integrated circuit 25A of the portable telephone apparatus 1A of the second preferred embodiment with a touch panel part 31B, a controller 47B, a touch panel processing integrated circuit 46D and an application integrated circuit 25B. In this case, each of the touch panel processing integrated circuit 46D and the application integrated circuit 25B is an LSI formed of one silicon device. The touch panel processing integrated circuit 46D is configured to include a touch panel signal processing circuit 461B, a buffer memory 462, and a proximity wireless communication circuit 463B. In addition, the proximity wireless communication circuit 463B is configured to include induction coils A1, A2, A3, B1, B2, ..., H1, H2, and H3, transceiving buffer circuits A1d, A2d, A3d, B1d, B2d, ..., H1d, H2d and H3d including transmitting buffers and receiving buffers connected to the induction coils A1, A2, A3, B1, B2, ..., H1, H2, and H3, respectively, and an array antenna selection control circuit 464B that executes on/off control of the transmitting buffers and receiving buffers of the transmitting buffers A1d, A2d, A3d, B1d, B2d, ..., H1d, H2d and H3d. Further, the application integrated circuit 25B is configured to include a proximity wireless communication circuit 251B and an application processing circuit 252B. In this case, the proximity wireless communication circuit 251B is configured to include induction coils R1, R2 and R3, and transceiving buffer circuits R1d, R2d and R3d including transmitting buffers and receiving buffers connected to the respective induction coils R1, R2 and R3.

Referring to FIG. 22, the touch panel part 31B is an electronic equipment to detect an event that the user has touched the touch panel part 31B, and output signal data including information concerning the touch to the touch panel signal processing circuit 461B, while displaying signal data of video data and the like from the touch panel signal processing circuit 461B. In addition, the touch panel signal processing circuit 461B outputs the output signal from the touch panel part 31B to the proximity wireless communication circuit 463B via the buffer memory 462, while outputting the video data received from the proximity wireless communication circuit 463B via the buffer memory 462 to the touch panel part 31B to display the data.

In addition, the application processing circuit 252B turns on the transmitting buffers of the transceiving buffer circuits R1c, R2c and R3c at the time of transmitting the video data, so as to wirelessly transmit the video data to be transmitted toward the proximity wireless communication circuit 463B via the transceiving buffer circuits R1c, R2c and R3c and the induction coils R1, R2 and R3. Further, the application processing circuit 252B turns on the receiving buffers of the transceiving buffer circuits R1c, R2c and R3c at the time of receiving data, so as to wirelessly receive data from the proximity wireless communication circuit 463B via the induction coils R1, R2 and R3.

The controller 47B is configured to include the table memory 47m that previously stores the array antenna selection table 47t in a manner similar to that of the controller 47 of the first preferred embodiment. When the user rotates the movable housing 3A, the controller 47 detects the rotation angle θ3 of the movable housing 3A based on an output signal from the rotation angle detector circuit 37. Then, the controller 47B determines the rotation angle θ4 of the movable housing 4A and three induction coils to be selected with reference to the array antenna selection table 47t based on the detected rotation angle θ3. Further, the controller 47B controls the stepping motor 43 to rotate the touch panel processing integrated circuit 46D by the rotation angle θ4. In this case, the controller 47B controls the array antenna selection control circuit 464B to turn on the transmitting buffers of the transceiving buffer circuits connected to the respective selected three induction coils at the time of transmitting data to the application integrated circuit 25B, and controls the array antenna selection control circuit 464B to turn on the receiving buffers of the transceiving buffer circuits connected to the respective selected three induction coils at the time of receiving data from the application integrated circuit 25B.

The present preferred embodiment exhibits action and advantageous effects similar to those of the first preferred embodiment.

In the above-described preferred embodiments and the modified preferred embodiments, the wireless TSV to perform proximity wireless communications is used by opposing the induction coils to each other to so that the induction coils are inductively coupled, however, the present invention is not limited to this. It is acceptable to use another proximity wireless communication method such as Transfer Jet oppose to perform proximity wireless communications by opposing antenna elements, that have a relatively narrow directional pattern, to each other. In addition, it is acceptable to perform proximity wireless communications by using a helical antenna or a meander line antenna that has a predetermined frequency in place of the induction coils A1, A2, A3, B1, B2, ..., H1, H2, H3, R1, R2 and R3, and by utilizing magnetic field coupling or electric field coupling (referred to as electromagnetic field coupling utilizing a resonance phenomenon or electromagnetic field resonant coupling) at the time of resonance of the mutually opposing helical antennas or meander line antennas.

In addition, in the above-described preferred embodiments and modified preferred embodiments, the plurality of array antennas 49A to 49H or the plurality of array antennas 49A-1 to 49H-1 are provided at the fixed housing 2 or 2A, and one array antenna 28 or 28A is provided at the movable housing 4 or 4A, however, the present invention is not limited to this. It is acceptable to provide one array antenna 28 or 28A at the fixed housing 2 or 2A and provide the plurality of array antennas 49A to 49H or the plurality of array antennas 49A-1 to 49H-1 at the movable housing 4 or 4A. In this case, at the movable housing 4 or 4A, the rotation angle θ4 of the movable housing 4 or 4A is determined to rotate the movable housing 4 or 4A by the rotation angle θ4, and the information of the movable rotation angle θ4 is wirelessly transmitted from the movable housing 4 or 4A to the fixed housing 2 or 2A in a manner similar to one of the above-described preferred embodiments and modified preferred embodiments. Then, in the fixed housing 2 or 2A, one of the plurality of array antennas 49A to 49H or the plurality of array antennas 49A-1 to 49H-1 is selected based on the received rotation angle θ4, and proximity wireless communications are performed between the selected array antenna and the array antenna 28 or 28A of the movable housing 4 or 4A.

Industrial Applicability

As described above in detail, the proximity wireless communication apparatus of the present invention selects one of the plurality of second array antennas provided for the first movable housing, controls the first driving means so that a selected second array antenna opposes to the first array antenna, and controls the first and second proximity wireless communication circuits to perform a proximity wireless communication between the first and second proximity wireless communication circuits via the first array antenna and the selected second array antenna. Therefore, according to the proximity wireless communication apparatus of the present invention can be rotated endlessly on the fixed housing. In addition, since the proximity wireless communication is performed, it is possible to increase the data transfer speed to be larger than that of the prior art, and the proximity wireless communication apparatus of the present invention can be realized at a cost lower than that of the prior art.

Further, the proximity wireless communication apparatus of the present invention selects one of the plurality of second array antennas so that a magnitude of a difference between a rotation angle of the first movable housing and a rotation angle of the second movable housing becomes a minimum based on the rotation angle of the second movable housing, controls the first driving means so that a selected second array antenna opposes to the first array antenna, and controls the first and second proximity wireless communication circuits to perform a proximity wireless communication between the electronic equipment and the first proximity wireless communication circuit via the second proximity wireless communication circuit Therefore, the second movable can be rotated endlessly on the fixed housing.

The proximity wireless communication apparatus of the present invention is useful as a proximity wireless communication apparatus for a surveillance camera apparatus that endlessly rotates in the pan direction or a portable telephone apparatus having a rotary display that endlessly rotates. In addition, since the proximity wireless communication circuit can be realized at lower cost than that of the wireless communication circuit having a high-frequency circuit, the proximity wireless communication apparatus of the present invention is also useful as a proximity wireless communication apparatus for surveillance camera apparatuses intended for not only business use but also consumer use.

Reference Signs List
1 . . . camera apparatus;
1A and 1B . . . portable telephone apparatus;
2 and 2A . . . fixed housing;
3 and 3A . . . movable housing;
4 and 4A . . . movable housing;
5 . . . flexible cable;
21 . . . rotation axis;
22 . . . dielectric substrate;
23 and 24 . . . magnet;
25, 25A, 25B, 25C, 25D and 25E . . . application integrated circuit;
26 and 27 . . . gear;
28 and 28A . . . array antenna;
31 . . . camera part;
31A . . . display part;
31B . . . touch panel part;
32 . . . gear;
33 . . . stepping motor;
34 . . . encoder;
35 . . . driving apparatus;
36 . . . Hall element;
37 . . . rotation angle detector;
39 . . . operation input part;
41 . . . Hall element;
42 . . . gear;
43 . . . stepping motor;
44 . . . encoder;
45 . . . driving apparatus;
46, 46A, 46B, 46C, 46D, 46E and 46F . . . imaging process integrated circuit;
46C . . . display process integrated circuit;
46D . . . touch panel processing integrated circuit;
47, 47A and 47B . . . controller;
47m . . . table memory;
47t . . . array antenna selection table;
48 . . . dielectric substrate;
49A to 49H . . . array antenna;
49A-1 to 49H-1, 49A-2 to 49H-2, 49A-3 to 49H-3, 49A-4 to 49H-4 and 49A-5 to 49H-5 . . . array antenna;
251, 251A and 251B . . . proximity wireless communication circuit;
252, 252A and 252B . . . application processing circuit;
461 . . . camera signal processing circuit;
461A . . . display signal processing circuit;
461B . . . touch panel signal processing circuit;
462 . . . buffer memory;
463, 463A and 463B proximity wireless communication circuit;
464, 464A and 464B . . . array antenna selection control circuit;
A1, A2, A3, B1, B2, . . . , H1, H2 and H3 . . . induction coil;
A1$b$, A2$b$, A3$b$, B1$b$, B2$b$, H1$b$, H2$b$ and H3$b$ . . . transmitting buffer;
A1$c$, A2$c$, A3$c$, C1$c$, C2$c$, H1$c$, H2$c$ and H3$c$ . . . receiving buffer;
A1$d$, A2$d$, A3$d$, D1$d$, D2$d$, . . . , H1$d$, H2$d$ and H3$d$ . . . transceiving buffer circuit;
R1, R2 and R3 . . . induction coil;
R1$b$, R2 and R3$b$ . . . receiving buffer;
R1$c$, R2$c$ and R1$c$ . . . transmitting buffer; and
R1$d$, R2$d$ and R3$d$ . . . transceiving buffer circuit.

The invention claimed is:

1. A proximity wireless communication apparatus comprising a fixed housing and a first movable housing provided so as to rotate about a predetermined rotation axis on the fixed housing,
wherein the fixed housing comprises a first proximity wireless communication circuit comprising a first array antenna including a plurality of antenna elements each fixed in the fixed housing, and
wherein the first movable housing comprises:
a first driving apparatus that rotates the first movable housing;
a second proximity wireless communication circuit comprising a plurality of second array antennas, each of the plurality of second array antennas including a plurality of antenna elements fixed in the first movable housing and being arranged to oppose to the first array antenna when the first movable housing is rotated by a predetermined rotation angle; and
a controller that selects one of the plurality of second array antennas, controls the first driving apparatus so that a selected second array antenna opposes to the first array antenna, and controls the first and second proximity wireless communication circuits to perform a proximity wireless communication between the first and second proximity wireless communication circuits via the first array antenna and the selected second array antenna.

2. The proximity wireless communication apparatus as claimed in claim 1,
wherein the proximity wireless communication is one of a wireless communication from the first proximity wireless communication circuit to the second proximity wireless communication circuit, a wireless communication from the second proximity wireless communication circuit to the first proximity wireless communication circuit, and a bidirectional wireless communication between the first proximity wireless communication circuit and the second proximity wireless communication circuit.

3. The proximity wireless communication apparatus as claimed in claim 1,
wherein the plurality of second array antennas are arranged at predetermined angular intervals around the rotation axis.

4. The proximity wireless communication apparatus as claimed in claim 1,
wherein the plurality of antenna elements of the first array antenna are arranged on a straight line perpendicular to the rotation axis.

5. The proximity wireless communication apparatus as claimed in claim 1,
wherein the plurality of antenna elements of the first array antenna are arranged on a plane perpendicular to the rotation axis,
wherein part of the plurality of antenna elements of the first array antenna are arranged on a first straight line perpendicular to the rotation axis, and
wherein other antenna elements of the plurality of antenna elements of the first array antenna are arranged on a second straight line perpendicular to the rotation axis.

6. The proximity wireless communication apparatus as claimed in claim 1,
wherein the plurality of antenna elements of the first array antenna are arranged on a plane perpendicular to the rotation axis, and
wherein the plurality of antenna elements of the first array antenna are arranged on a plurality of straight lines perpendicular to the rotation axis, respectively.

7. The proximity wireless communication apparatus as claimed in claim 1,
wherein one antenna element of the plurality of antenna elements of the first array antenna is arranged on the rotation axis.

8. The proximity wireless communication apparatus as claimed in claim 1, further comprising a second movable housing provided to rotate about the rotation axis on the fixed housing,
wherein the second movable housing comprises an electronic equipment that is fixed to the second movable housing and performs wired communication with the second proximity wireless communication circuit, and
wherein the controller selects one of the plurality of second array antennas so that a magnitude of a difference between a rotation angle of the first movable housing and a rotation angle of the second movable housing becomes a minimum based on the rotation angle of the second movable housing, controls the first driving apparatus so that a selected second array antenna opposes to the first array antenna, and controls the first and second proximity wireless communication circuits to perform a proximity wireless communication between the electronic equipment and the first proximity wireless communication circuit via the second proximity wireless communication circuit.

9. The proximity wireless communication apparatus as claimed in claim 3, further comprising a second movable housing provided to rotate about the rotation axis on the fixed housing,
wherein the second movable housing comprises electronic equipment that is fixed to the second movable housing and performs wired communication between the equipment and the second proximity wireless communication circuit, and
wherein the controller selects one of the plurality of second array antennas so that a magnitude of a difference between the rotation angle of the first movable housing and the rotation angle of the second movable housing becomes equal to or smaller than a half angle of the angular interval based on the rotation angle of the second movable housing, and controls the first and second proximity wireless communication circuits to perform a proximity wireless communication between the first and second proximity wireless communication circuits via the first array antenna and the selected second array antenna.

10. The proximity wireless communication apparatus as claimed in claim 8,
wherein the electronic equipment is wirely connected to the second proximity wireless communication circuit by means of a cable having a length required to rotate the first movable housing and the second movable housing mutually independently.

11. The proximity wireless communication apparatus as claimed in claim 1,
wherein the first movable housing further comprises a buffer memory that stores predetermined signal data, and
wherein the controller controls the first driving apparatus so that the selected second array antenna opposes to the first array antenna, and thereafter, controls the buffer memory to output signal data outputted to the buffer memory to the first proximity wireless communication circuit.

12. The proximity wireless communication apparatus as claimed in claim 11,
wherein the electronic equipment is an imaging apparatus that generates video data and outputs the video data to the buffer memory as the signal data.

13. The proximity wireless communication apparatus as claimed in claim 8,
wherein the second movable housing comprises a second driving apparatus that rotates the second movable housing, and
wherein the controller controls the second driving apparatus to direct the electronic equipment toward a predetermined direction.

14. The proximity wireless communication apparatus as claimed in claim 13,
wherein the controller controls the second driving apparatus to continuously rotate the electronic equipment.

15. The proximity wireless communication apparatus as claimed in claim 13,
wherein the controller controls the second driving apparatus to rotate the electronic equipment in steps.

16. The proximity wireless communication apparatus as claimed in claim 1,
wherein each of the plurality of antenna elements of the first array antenna is an induction coil,
wherein each of the plurality of antenna elements of the second array antenna is an induction coil, and
wherein, when the first array antenna and the selected second array antenna oppose to each other, the induction coils of the first array antenna and the induction coils of the selected second array antenna are inductively coupled with each other, respectively.

17. The proximity wireless communication apparatus as claimed in claim 1,
wherein each of the plurality of antenna elements of the first array antenna has a predetermined resonance frequency,
wherein each of the plurality of antenna elements of the second array antenna has the resonance frequency, and wherein, when the first array antenna and the selected second array antenna oppose to each other, the antenna elements of the first array antenna and the antenna elements of the selected second array antenna are electromagnetically coupled with each other.

* * * * *